(12) United States Patent
van Houtum

(10) Patent No.: US 11,722,197 B2
(45) Date of Patent: Aug. 8, 2023

(54) RECEIVER SYSTEM

(71) Applicant: NXP B.V., Eindhoven (NL)

(72) Inventor: Wilhelmus Johnannes van Houtum, Sint-oedenrode (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/649,932

(22) Filed: Feb. 4, 2022

(65) Prior Publication Data

US 2022/0247471 A1 Aug. 4, 2022

(30) Foreign Application Priority Data

Feb. 4, 2021 (EP) .................................... 21155126

(51) Int. Cl.
| | |
|---|---|
| H04B 7/06 | (2006.01) |
| H04B 7/0456 | (2017.01) |
| H04B 7/08 | (2006.01) |

(52) U.S. Cl.
CPC ......... *H04B 7/0634* (2013.01); *H04B 7/0456* (2013.01); *H04B 7/0842* (2013.01)

(58) Field of Classification Search
CPC .. H04B 7/0634; H04B 7/0456; H04B 7/0842; H04B 7/086; H04B 7/0871; H04B 7/0857; H01Q 3/2623
See application file for complete search history.

(56) References Cited

U.S. PATENT DOCUMENTS

| | | |
|---|---|---|
| 7,349,667 B2 | 3/2008 | Magee et al. |
| 7,558,337 B2 | 7/2009 | Ma et al. |

(Continued)

OTHER PUBLICATIONS

Baumgartner, S., "Narrowband Interference Mitigation for SDR based DAB/DAB+ Receivers", IWSSIP 2014, 21st International Conference on Systems, Signals and Image Processing, May 12-15, 2014.

(Continued)

*Primary Examiner* — Vineeta S Panwalkar

(57) ABSTRACT

A receiver system (100) comprising: a plurality of receiver-input-terminals (102), each of which is configured to receive an input-signal from a respective antenna (106), wherein the input-signals comprise: i. one or more undesired-signal-components; and ii. one or more combined-signal-components. The receiver system (100) also includes a spatial-information-processing-block (112; 212) configured to: calculate spatial information (222) of the undesired-signal-components of the plurality of input-signals; calculate spatial information (220) of the combined-signal-components of the plurality of input-signals; calculate weighting-coefficients (226) for each of the input-signals based on the spatial information (220) of the combined-signal-components and the spatial information (222) of the undesired-signal-components; and combine the plurality of input-signals by applying the weighting-coefficients to each of the input-signals to provide a spatial-output-signal (114; 214). The receiver system (100) further includes a signal-combiner (130) configured to combine a plurality of signal-processing-path-output-signals (110) with the spatial-output-signal (114; 214) in order to provide a receiver-output-signal (108).

20 Claims, 11 Drawing Sheets

(56) References Cited

U.S. PATENT DOCUMENTS

| | | |
|---|---|---|
| 2003/0185285 A1 | 10/2003 | Talwar |
| 2013/0308717 A1* | 11/2013 | Maltsev ............... H04B 7/0417 |
| | | 375/267 |
| 2016/0142119 A1 | 5/2016 | Van Houtum |
| 2016/0181693 A1 | 6/2016 | Kapoor et al. |
| 2019/0356347 A1 | 11/2019 | Van Houtum |

OTHER PUBLICATIONS

EBU-ETSI-standard; "Radio Broadcasting Systems; Digital Audio Broadcasting (DAB) to mobile, portable and fixed receivers" ETSI EN 300 401 v2.1.1, Jan. 2017.

Fazel, K., "Narrow-Band Interference Rejection in Orthogonal Multi-Carrier Spread-Spectrum Communications", Proceedings of 1994 3rd IEEE International Conference on Universal Personal Communications, Sep. 27-Oct. 1, 1994.

Koch, N., "EMC-Influences on Digital Broadcasting Services in Vehicular Environments", 2009 20th International Zurich Symposium on Electromagnetic Compatibility, Jan. 12-16, 2009.

Leost, Y., "Interference Rejection Combining in LTE Networks", Bell Labs Technical Journal, Abstract, https://doi.org/10.1002/bltj.215229, Jun. 2012.

Mortazavi, S., "Investigation of Possible EM Interference of Automotive Multi-Gig Communication Link in the FM and DAB Ranges Using 3D Field Simulation", 2019 Joint International Symposium on Electromagnetic Compatibility, Sapporo and Asia-Pacific International Symposium on Electromagnetic Compatibility (EMC Sapporo/APEMC), Jun. 3-7, 2019.

Narasimhan, R., "Channel Estimation and Co-Channel Interference Rejection for LTE-Advanced MIMO Uplink", 2012 IEEE Wireless Communications and Networking Conference (WCNC), Apr. 1-4, 2012.

Pereira, G., "Addressing IQ Mismatch in Spatial Interference Suppression Systems", 2012 IEEE Military Communications Conference, pp. 1-7, Oct. 29, 2012.

Proakis, J., "Digital Communications", 5th-edition, ISBN-978-0-07-295716-7, Jan. 2018.

Rostamzadeh, C., "Investigation of electromagnetic field coupling from DC-DC buck converters to automobile AM/FM antennas", 2016 IEEE International Symposium on Electromagnetic Compatibility (EMC), Jul. 25-29, 2016.

Van Trees, H., "Optimum Array Processing: Part IV of Detection, Estimation, and Modulation Theory", Wiley Interscience, ISBN 0-471-22110-4, Mar. 22, 2002.

Yin, J., "Frequency-domain equalization with interference rejection combining for single carrier multiple-input multiple-output underwater acoustic communications", The Journal of the Acoustical Society of America 147, EL138 (2020); https://doi.org/10.1121/10.0000711, Feb. 2020.

Zeng, Z., "Adaptive IRC algorithm to overcome inter-cell interference in uplink LTE system", 2011 International Conference on Multimedia Technology, Jul. 26-28, 2011.

\* cited by examiner

[1] condition is that the FFT is ready

RECEIVER SYSTEM

CROSS-REFERENCE TO RELATED APPLICATIONS

This application claims the priority under 35 U.S.C. § 119 of European Patent application no. 21155126.2, filed on 4 Feb. 2021, the contents of which are incorporated by reference herein.

FIELD

The present disclosure relates to receiver systems, and in particular, to receiver systems that have a plurality of antennae for receiving a transmitted signal, such as a Digital Audio Broadcasting (DAB) signal.

SUMMARY

According to a first aspect of the present disclosure there is provided a receiver system comprising:
- a plurality of receiver-input-terminals, each of which is configured to receive an input-signal from a respective antenna, wherein the input-signals comprise:
  - i. one or more undesired-signal-components that represent noise components and/or interference-components; and
  - ii. one or more combined-signal-components that represent:
- a) transmitted-signal-components, and b) noise components and/or interference-components;
- a plurality of signal-processing-paths, each configured to:
  - process an input-signal from a respective one of the plurality of receiver-input-terminals; and
  - provide a signal-processing-path-output-signal;
- a spatial-information-processing-block configured to:
  - calculate spatial information of the undesired-signal-components of the plurality of input-signals;
  - calculate spatial information of the combined-signal-components of the plurality of input-signals;
  - calculate weighting-coefficients for each of the input-signals based on the spatial information of the combined-signal-components and the spatial information of the undesired-signal-components; and
  - combine the plurality of input-signals by applying the weighting-coefficients to each of the input-signals to provide a spatial-output-signal; and
- a signal-combiner configured to combine each of the signal-processing-path-output-signals with the spatial-output-signal in order to provide a receiver-output-signal.

Advantageously such a receiver system can reduce the negative effects of interference-signals, and improve the quality of the receiver-output-signal, without requiring any additional antennae.

In one or more embodiments the one or more undesired-signal-components do not include transmitted-signal-components.

In one or more embodiments the spatial-information-processing-block is configured to:
  calculate the spatial information of the undesired-signal-components of the plurality of input-signals by determining phase-rotations of the undesired-signal-components; and
  calculate the spatial information of the combined-signal-components of the plurality of input-signals by determining phase-rotations of the combined-signal-components.

In one or more embodiments the spatial-information-processing-block is configured to:
  calculate the spatial information of the undesired-signal-components of the plurality of input-signals by determining a spatial covariance matrix for the undesired-signal-components; and
  calculate the spatial information of the combined-signal-components of the plurality of input-signals by determining a spatial covariance matrix for the combined-signal-components.

In one or more embodiments the spatial-information-processing-block is configured to:
  calculate the weighting-coefficients for each of the input-signals by applying a profit function to the spatial information of the combined-signal-components and the spatial information of the undesired-signal-components.

In one or more embodiments the spatial-information-processing-block is configured to:
  calculate the weighting-coefficients for each of the input-signals by maximising a SINR profit function, wherein:
    the spatial information of the combined-signal-components represents the S of the SINR profit function; and
    the spatial information of the undesired-signal-components represents the IN of the SINR profit function.

In one or more embodiments the signal-combiner is configured to apply a maximum-ratio combining algorithm in order to combine each of the signal-processing-path-output-signals with the spatial-output-signal and provide a receiver-output-signal.

In one or more embodiments:
  i. the one or more undesired-signal-components represent one or more null-periods of the input-signal, wherein the null-periods represent periods in time that the input-signal does not contain any transmitted data; and
  ii. the one or more combined-signal-components represent one or more transmission-periods of the input-signal, wherein the transmission-periods represent periods in time that the input-signal contains transmitted data.

In one or more embodiments the input-signals are DAB signals. The null-periods may be null-symbols in the DAB signals.

In one or more embodiments:
  i. the one or more undesired-signal-components represent one or more null-carriers of the input-signal, wherein the null-carriers represent frequencies at which the input-signal does not contain any transmitted data; and
  ii. the one or more combined-signal-components represent one or more transmission-carriers of the input-signal, wherein the transmission-carriers represent frequencies at which the input-signal contain transmitted data.

In one or more embodiments the input-signals are OFDM signals. The null-carriers may represent predetermined frequencies between adjacent channels.

In one or more embodiments the signal-combiner is configured to reduce first-adjacent co-channel interference signals and provide the receiver-output-signal by combining each of the signal-processing-path-output-signals with the spatial-output-signal by using a statistically-based analysis of the spatial-output-signal to compensate for the first-adjacent co-channel interference.

In one or more embodiments the signal-combiner is configured to perform maximum-ratio combining on the signal-processing-path-output-signals with the spatial-output-signal.

According to another aspect of the present disclosure, there is provided a method comprising:

receiving a plurality of input-signals from respective antennae, wherein the input-signals comprise:
  i. one or more undesired-signal-components that represent noise components and/or interference-components; and
  ii. one or more combined-signal-components that represent:
  a) transmitted-signal-components, and b) noise components and/or interference-components;

processing each input-signal to provide a respective signal-processing-path-output-signal;

calculating spatial information of the undesired-signal-components of the plurality of input-signals;

calculating spatial information of the combined-signal-components of the plurality of input-signals;

calculating weighting-coefficients for each of the input-signals based on the spatial information of the combined-signal-components and the spatial information of the undesired-signal-components;

combining the plurality of input-signals by applying the weighting-coefficients to each of the input-signals to provide a spatial-output-signal; and combining each of the signal-processing-path-output-signals with the spatial-output-signal in order to provide a receiver-output-signal.

There is also disclosed an automobile, such as a car, that includes any receiver system disclosed herein. The receiver system may be a DAB receiver system or an OFDM receiver system.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

The well-known Maximum-Ratio Combining (MRC) is used for reception of the DAB (Digital Audio Broadcasting) digital-radio broadcast-signals within a multiple-path (antennae) scenario. The principle of MRC is that the received-power of each path (antenna) is controlled in such a way that it is constructively (coherently) added. However, the performance of known MRC systems can be limited by the fact that a receiving-antenna receives stronger electromagnetic waves in some directions than in others, i.e., a non-ideal omni-directional antenna scenario. Furthermore, known MRC systems are also not capable of (controlled) suppression of undesired-signals.

Figure 1:
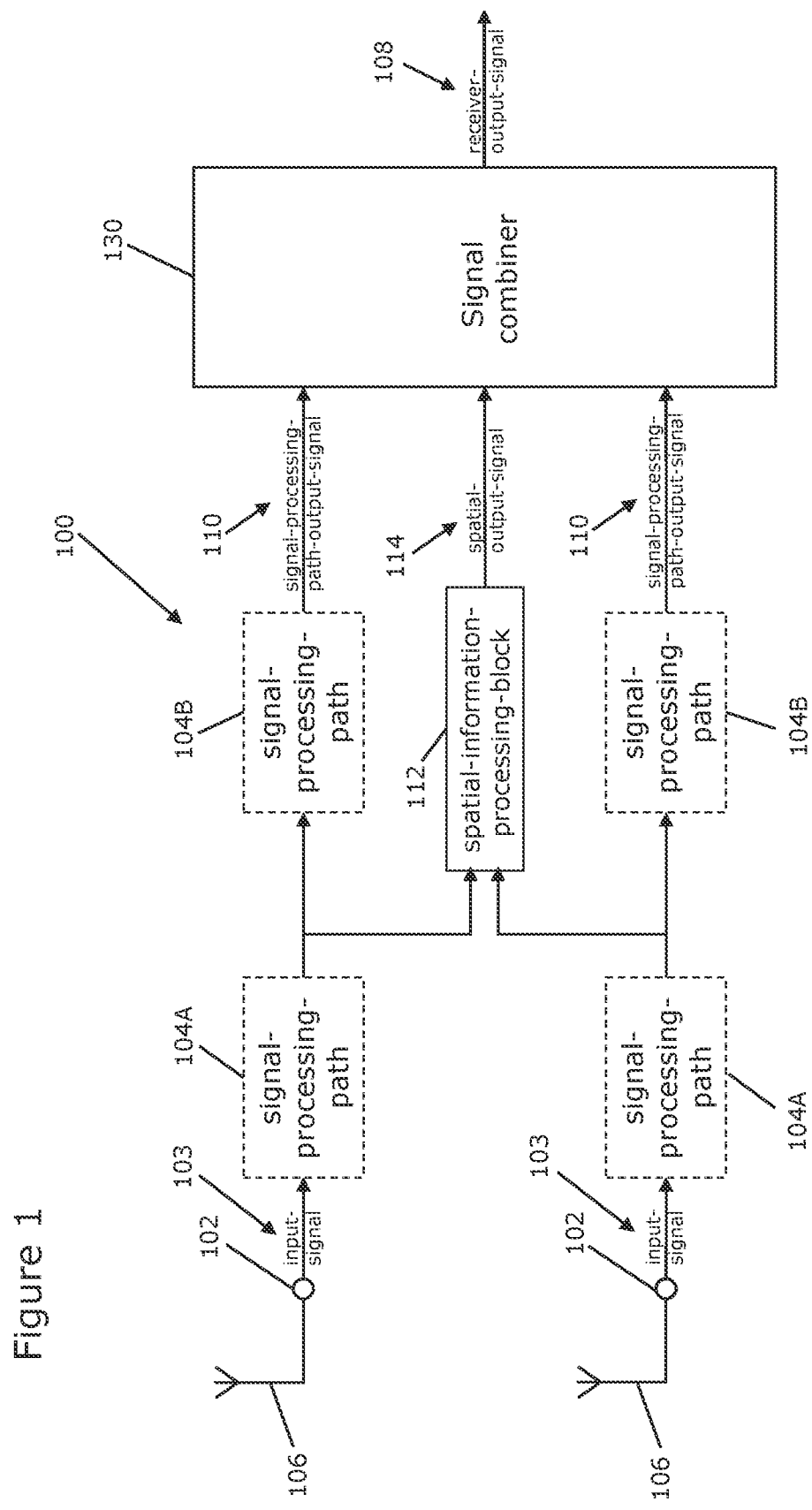
FIG. 1 shows an example embodiment of a receiver system.

FIG. 1 shows an example embodiment of a receiver system 100. The receiver system 100 includes a plurality of receiver-input-terminals 102 (in this example two receiver-input-terminals 102), each of which is configured to receive an input-signal 103 from a respective antenna 106. The receiver system provides a receiver-output-signal 108, which is based on the received input-signals 103. The receiver system 100 can be a DAB receiver system that receives DAB input signals. In other examples, the input-signals 103 can be any other type of Orthogonal Frequency Division Multiplexing (OFDM) signals.

As will be discussed below, advantageously such a receiver system 100 reduce the negative effects of interference-signals, and improve the quality of the receiver-output-signal 108, without requiring any additional antennae.

The input-signals 103 comprise: one or more undesired-signal-components, and one or more combined-signal-components. These different components may be received at different instants in time, for instance according to the structure of a transmission frame for a given transmission standard). Alternatively, these different components may correspond to different frequencies (such as different frequency bins/ranges) in a frequency channel grid.

The one or more undesired-signal-components represent noise components and/or interference-components, but do not include transmitted-signal-components. In relation to a common way of considering SINR (signal-to-interference-plus-noise ratio), the undesired-signal-components can be considered as equivalent to the "interference-plus-noise".

In the time domain, the one or more undesired-signal-components can represent one or more null-periods of the input-signal 103, wherein the null-periods represent periods in time that the input-signal 103 does not contain any transmitted data. For example, if the input-signals 103 are DAB signals, then the null-periods can be null-symbols in the DAB signals. It is common for one of the noise components and the interference-components to have a higher power than the other, and therefore be considered as a dominant source of the undesired-signal-components.

In the frequency domain, the one or more undesired-signal-components can represent one or more null-carriers of the input-signal 103, wherein the null-carriers represent frequencies at which the input-signal 103 does not contain any transmitted data. For example, if the input-signals 103 are OFDM signals, then the null-carriers can represent predetermined frequencies between adjacent channels.

The one or more combined-signal-components represent: a) transmitted-signal-components, and b) noise components and/or interference-components. In relation to a common way of considering SINR (signal-to-interference-plus-noise ratio), the combined-signal-components can be considered as equivalent to both the "signal" and the "interference-plus-noise".

In the time domain, the one or more combined-signal-components can represent one or more transmission-periods of the input-signal 103, wherein the transmission-periods represent periods in time that the input-signal 103 contains transmitted data. For example, if the input-signals 103 are DAB signals, then the transmission-periods can include one or more of the TFPR symbols, the FIC symbols and the MSC symbols. (Further details of the DAB frame structure are provided below.)

In the frequency domain, the one or more combined-signal-components can represent one or more transmission-carriers of the input-signal 103, wherein the transmission-carriers represent frequencies at which the input-signal 103 contain transmitted data.

The receiver system includes a plurality of signal-processing-paths 104A, 104B, each configured to: process an input-signal 103 from a respective one of the plurality of receiver-input-terminals 102; and provide a signal-processing-path-output-signal 110. Each signal-processing-path is shown schematically in FIG. 1 as two separate blocks 104A, 104B. It will be appreciated from the description that follows, that each signal-processing-path can perform a variety of processing operations such as, but not limited to: a FFT (Fast Fourier Transform) to convert signals from the time domain to the frequency domain, filtering, down-conversion, baseband sampling, demodulation, and analogue to digital conversion. These processing operations can be performed in either of the signal-processing-path blocks 104A, 104B that are shown in FIG. 1.

The receiver system 100 also includes a spatial-information-processing-block 112 that processes the plurality of input-signals 103 and provides a spatial-output-signal 114. The spatial-information-processing-block 112 may receive the input-signals 103 directly from the receiver-input-terminals 102, which would be represented by FIG. 1 if all of the processing operations for the signal-processing-path is performed by block 104B, and none is performed by block 104A. Alternatively, the spatial-information-processing-block 112 may receive the input-signals 103 indirectly from the receiver-input-terminals 102 such that they have been pre-processed before they are received by the spatial-information-processing-block 112. This would be represented by FIG. 1 if at least some of the processing operations for the signal-processing-path is performed by block 104A. The spatial-information-processing-block 112 can process the input-signals 103 in either the time or the frequency domain.

Figure 2:
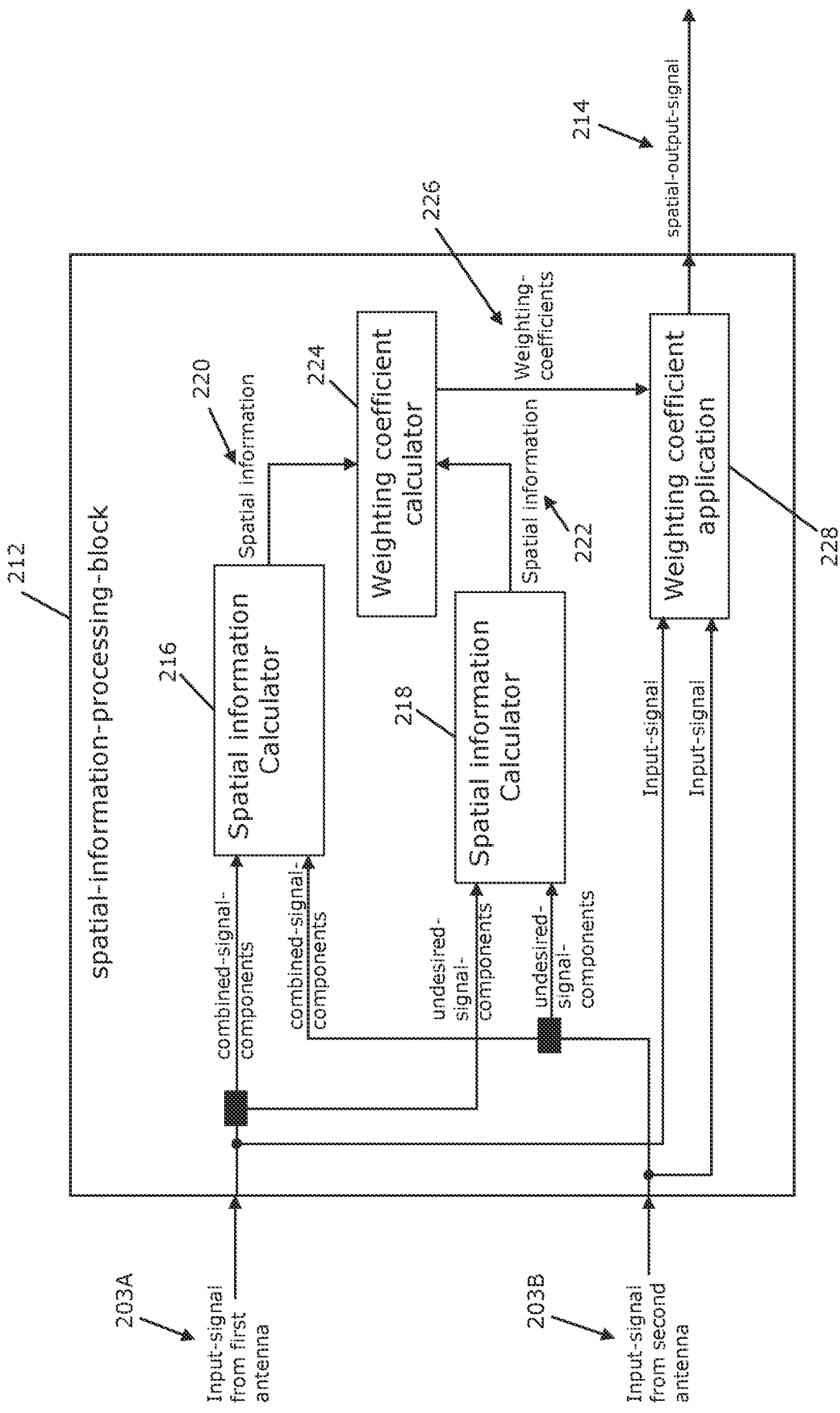
FIG. 2 shows the spatial-information-processing-block of FIG. 1 in more detail.

FIG. 2 shows the spatial-information-processing-block 212 of FIG. 1 in more detail.

In FIG. 2, each input-signal 203A, 203B is shown schematically as being split into combined-signal-components and undesired-signal-components. In examples where the components are at different frequencies, the components can be separated from each other using one or more filters. In examples where the components are at different instants in time (such as the null-symbols in a DAB input-signal), the components can be separated from each other using time division demultiplexing. For example, the spatial-information-processing-block 212 can use a first (in-time) process for the NULL-symbol and then a next (in-time) process for the data-carrying OFDM-symbol(s).

The spatial-information-processing-block 212 in this example includes a combined-spatial-energy-calculator 216 and an undesired-spatial-energy-calculator 218. The combined-spatial-energy-calculator 216 calculates spatial information 220 of the combined-signal-components of the plurality of input-signals 203A, 203B. The undesired-spatial-energy-calculator 218 calculates spatial information 222 of the undesired-signal-components of the plurality of input-signals 203A, 203B. These calculators 216, 218 can calculate the spatial information of the signal-components of the plurality of input-signals by determining phase-rotations of the signal-components. This is described in more detail below with reference to the detailed mathematical explanation in section 1.2.1, and more particularly, with reference to Eq 1-5. Specifically, the off-diagonal elements of the spatial covariance-matrices in Eq.5 are representative of the spatial-information by their phases.

The spatial information 220, 222 is representative of the direction from which signalling is received at the plurality of antennae that receive the input-signals 203A, 203B. Therefore, the spatial information 222 for the undesired-signal-components is representative of the direction from which the strongest interference or noise signals are received. The spatial information 220 for the combined-signal-components is representative of the direction from which the strongest transmitted data, interference or noise signals are received.

The spatial-information-processing-block 212 also includes a weighting-coefficient-calculator 224 that calculates weighting-coefficients 226 for each of the input signals 203A, 203B based on the spatial information 220 of the combined-signal-components and the spatial information 222 of the undesired-signal-components. This is described in more detail below with reference to the detailed mathematical explanation in section 1.2.1, and more particularly, with reference to Eq 6-13. Specifically, solving the eigenvalue problem to maximize a specific profit-function (e.g. a ZINR profit-function with EVD and PCA) is one implementation of calculating the weighting-coefficients 226.

Finally, the spatial-information-processing-block 212 includes a weighting-coefficient-application block 228 that combines the plurality of input signals 203A, 203B by applying the weighting-coefficients 226 to the each of the input signals 203A, 203B to provide the spatial-output-signal 214. As will be discussed in detail below, the calculated spatial/directional information enables the undesired-signal-components to be reduced in the spatial-output-signal 214 when the undesired signals are received at the antennae from a different direction to the (desired) transmitted data. For this reason, the spatial-output-signal 214 can be referred to as a corrected input signal, or a cleaned-up input signal. When the spatial-output-signal 214 is subsequently combined with the signal-processing-path-output-signals, an improved spatial-output-signal can be achieved.

Returning to FIG. 1, the receiver system 100 includes a signal-combiner 130 that combines each of the signal-processing-path-output-signals 110 with the spatial-output-signal 114 in order to provide the receiver-output-signal 108.

In some examples, the signal-combiner 130 can apply a maximum-ratio combining (MRC) algorithm in order to combine each of the signal-processing-path-output-signals 110 with the spatial-output-signal 114. In this way, the "best" one of the signal-processing-path-output-signals 110 and the spatial-output-signal 114 can be predominantly used to calculate the spatial-output-signal 114. If there is a significant amount of noise or interference that is received at the antennae 106 from a different direction to the desired transmitted signal, then the spatial-output-signal 114 may represent the most accurate input to the signal-combiner 130. In which case, the signal-combiner 130 can combine the signals in such a way that the spatial-output-signal 114 has the most significant impact on the receiver-output-signal 108. If a significant amount of noise or interference is not received at the antennae 106 from a different direction to the desired transmitted signal, then the spatial-output-signal 114 may not represent the most accurate input to the signal-combiner 130. In which case, the signal-combiner 130 can combine the signals in such a way that one or both of the signal-processing-path-output-signals 110 has the most significant impact on the receiver-output-signal 108, and the spatial-output-signal 114 does not have a significant impact.

The signal-combiner 130 can in some examples be considered as an interference-cancelling circuit. It can reduce first-adjacent co-channel interference signals and provide the receiver-output-signal 108 by combining each of the signal-processing-path-output-signals 110 with the spatial-output-signal 114 by using a statistically-based analysis of the spatial-output-signal 114 to compensate for the first-adjacent co-channel interference.

In FIGS. 1 and 2, the use of the spatial-output-signal 114 can significantly improve the performance of the receiver system 100 in certain noisy/interference environments.

Additional details will now be provided in relation to example implementations of the receiver system that is described with reference to FIGS. 1 and 2.

1. Digital Audio Broadcasting and Time-Division Spatial Interference Rejection

Examples described herein can be considered as a Time-Division Spatial Interference Rejection (TDSIR)-procedure, which consists of a TDSIR-part (which is an example of a spatial-information-processing-block) and a maximal-ratio-Combining (MRC)-weighing-part, for rejection of, especially, the extremely-diverse interference-signals generated by electrical-vehicles that degrade or even make the reception of Digital Audio Broadcasting (DAB) data and audio-streams completely impossible. The term "Time-Division Spatial Interference Rejection" is especially relevant to a receiver system that is described herein when it is used to process DAB signals. This is because different time segments of a DAB frame can be used as the undesired-signal-components and the combined-signal-components that are described above.

Figure 7:
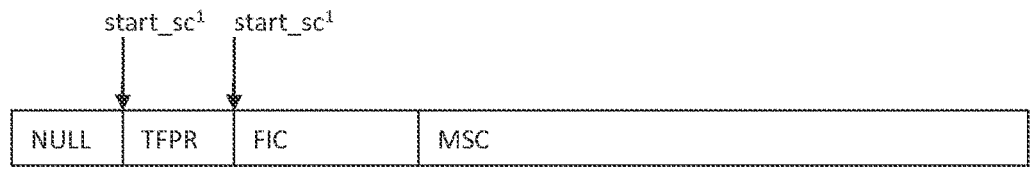
FIG. 7 shows a physical time-frame, i.e., transmission-frame, for DAB decoding.

The discussion on time-division (electronically-steered) beam-forming (BF) with nulling capabilities for Interference-Cancellation (IC), in this document, relates to the specific application-processing of a Digital Audio Broadcasting (DAB) time-domain OFDM-signal stream. The signal stream comprises a zero desired-signal-energy time-period, for example, at the beginning of the OFDM-signal stream, also known as a "NULL-symbol", which is an example of an undesired-signal-component that is described above. The signal stream also comprises successive multiple desired-signal-energy containing time-periods, also known as "OFDM-symbols", e.g., Time-Frequency-Phase-Reference (TFPR) OFDM-symbol, Fast-Information-Channel (FIC) OFDM-symbols, and Main-Service-Channel (MSC) OFDM-symbols. These are examples of the combined-signal-components that are described above. These signal-components are shown in FIG. 7, and will be described in more detail later.

The example that follows relates in particular to the "Digital Audio Broadcasting" (DAB) radio transmission system with, for example, an extremely wide variety of interference-signals originated within/from electrical-vehicles. The DAB-system is generally used to transmit digital-radio broadcast-signals on carrier-frequencies in "Band-III" (174 MHz-230 MHz), also known as the "high-band Very-High-Frequency (VHF)" and in the "L-band" (1452 MHz-1492 MHz), see for example, for the DAB allocated channels in Band-III, in FIG. 8.

For improved reception of the DAB digital-radio broadcast-signals within a multiple-path (antennae) scenario, the well-known Maximum-Ratio Combining (MRC) can be used. The principle of MRC is that the received-power of each path (antenna) is controlled in such a way that it is constructively (coherently) added. However, the performance of MRC is limited by the fact that a receiving-antenna receives stronger electromagnetic waves in some directions than in others, i.e., a non-ideal omni-directional antenna scenario. Furthermore, MRC is also not capable of (controlled) suppression of undesired-signals. On the other hand, time-division (electronically-steered) beam forming or phase-diversity do not suffer from these limitations.

Examples described herein apply beam forming for its nulling capabilities to cancel or at least partially reject (first-adjacent and co-channel) interference-signals as an extra path to an MRC device for its combining-capabilities. In this specific case for a DAB receiver with MRC processing that weighs also the interference-cancelation (IC)-path, in its outcome based on "bit-metrics" (such as Log-Likelihood Ratios (LLR)s) and the TDSIR-part operates on "time-samples".

FIGS. 3 to 6 show further example embodiments of receiver systems that are similar to that of FIG. 1. Components and signals in any one of FIGS. 3 to 6 that are also shown in FIG. 1 have been given corresponding reference numbers in the 300 to 600 series.

Figure 3:
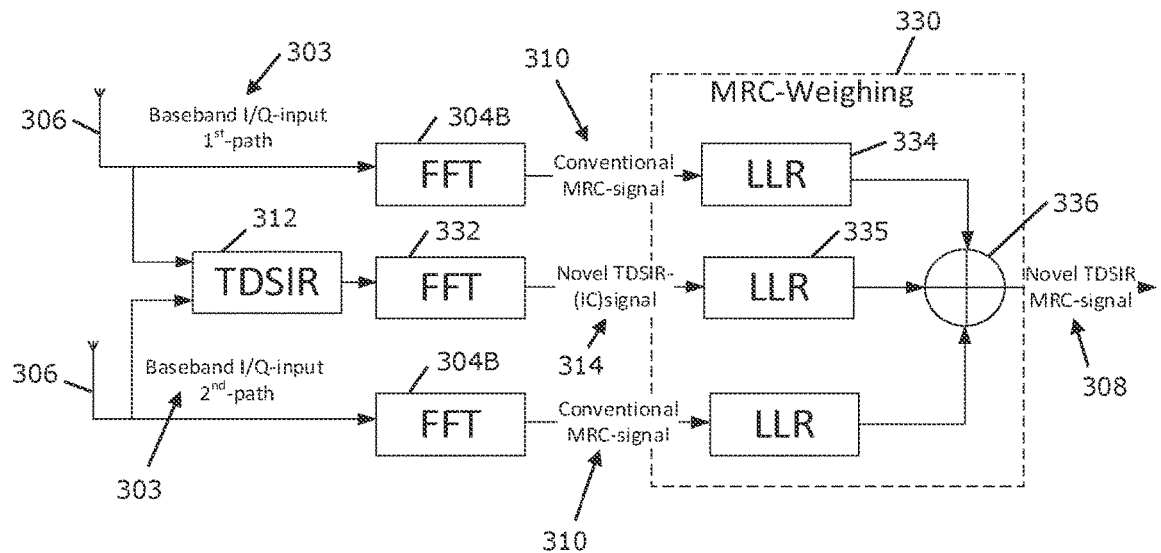
FIGS. 3 to 6 show further example embodiments of receiver systems that are similar to that of FIG. 1.
Figure 4:
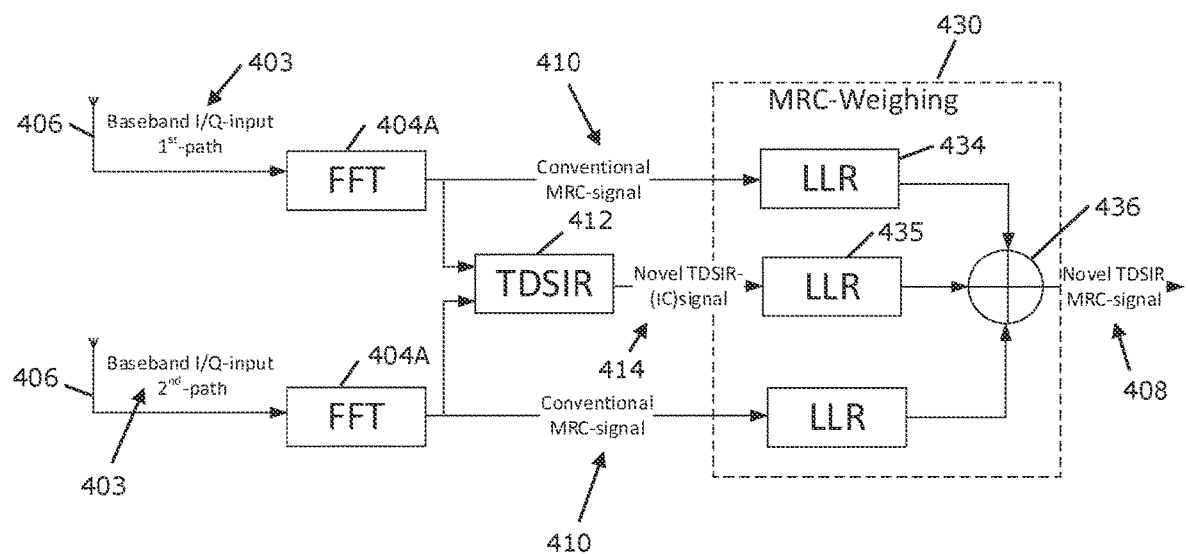
Figure 5:
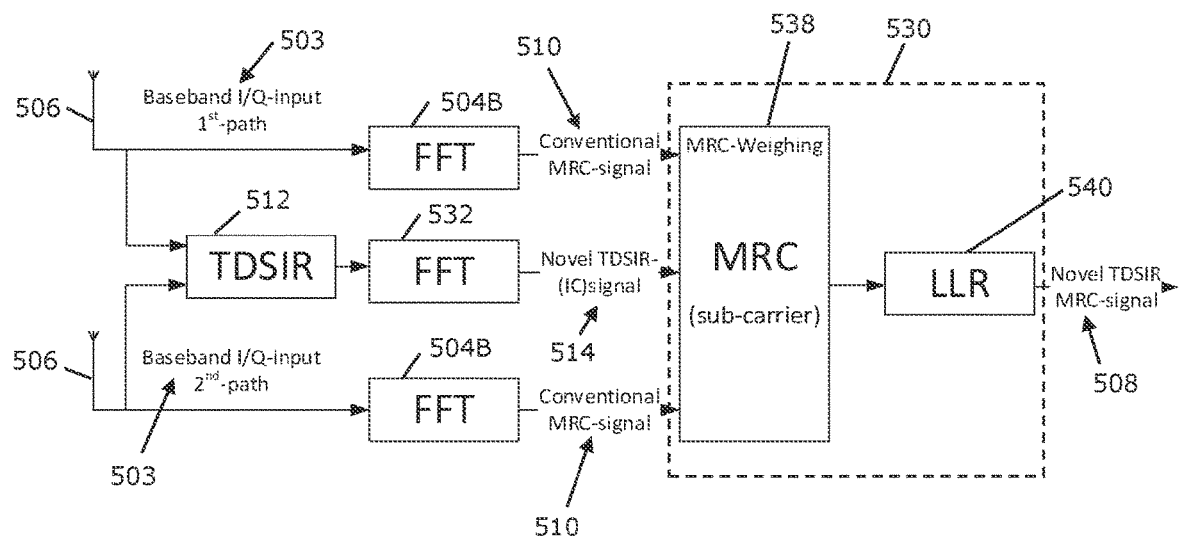
Figure 6:
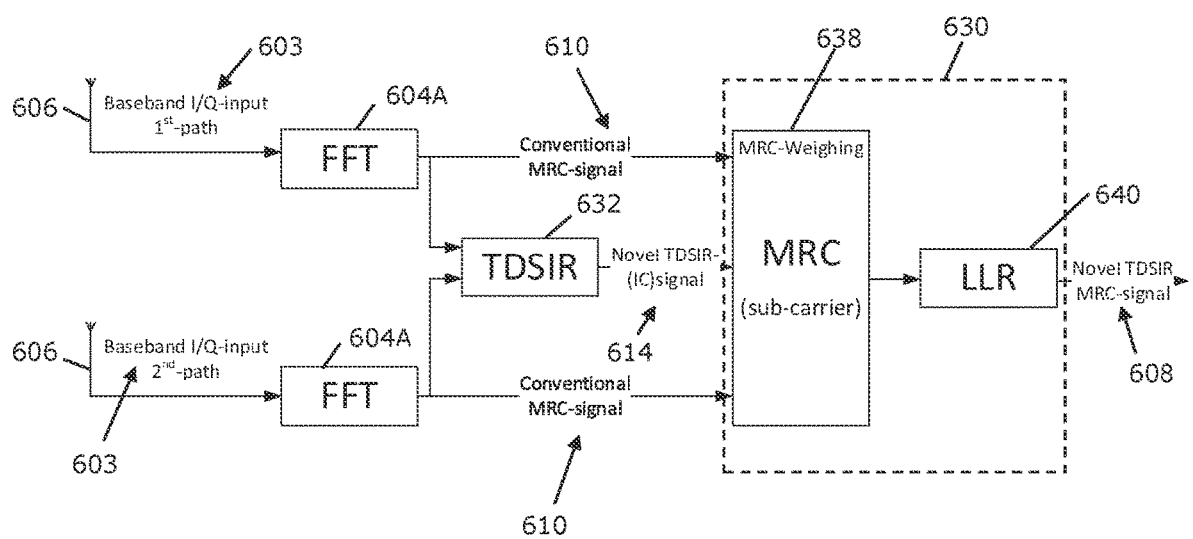

With reference to FIGS. 3 to 6:
- the receiver-output-signal of FIG. 1 is identified as a Novel TDSIR MRC-signal 308, 408, 508, 608 in FIGS. 3 to 6.
- the spatial-information-processing-block of FIG. 1 is implemented as a TDSIR block (TDSIR-part) 312, 412, 512, 612 in FIGS. 3 to 6.
- the only functionality of the signal-processing-paths of FIG. 1 that is shown in FIGS. 3 to 6 is the FFT.
  In FIGS. 4 and 6, the FFT 404A, 604A is performed on the input-signals 403, 603, and the output signals of the FFT 404A, 604A are provided as input signals to the TDSIR blocks 412, 612. Therefore, the TDSIR blocks 412, 612 operate on the input-signals 403, 603 in the frequency domain.
  In FIGS. 3 and 5, the FFT 304B, 504B is not in the signal path between the antennae 306, 506 and the TDSIR blocks 312, 512. Therefore, the TDSIR blocks 312, 512 operate on the input-signals 303, 503 in the time domain.
- the signal-processing-path-output-signals of FIG. 1 are identified as conventional MRC-signals 310, 410, 510, 610 in FIGS. 3 to 6.
- the spatial-output-signal of FIG. 1 is identified as a novel TDSIR-(IC) signal 314, 414, 514, 614 in FIGS. 3 to 6.

the signal-combiner or FIG. 1 is implemented by performing MRC weighing and applying LLRs (Log-likelihood ratios).

In FIGS. 3 and 4: an LLR 334, 434 is applied directly to each of the conventional MRC-signals 310, 410; an LLR 335, 435 is applied directly to the novel TDSIR-(IC) signal 314, 414; and the outputs of the LLR blocks 6335, 435 are combined by a signal combiner 336, 436 in order to provide the Novel TDSIR MRC-signal 308, 408.

In FIGS. 5 and 6: an MRC-weighing algorithm 538, 638 is applied directly to each of the conventional MRC-signals 510, 610 and the novel TDSIR-(IC) signal 514, 614; an LLR 540, 640 is applied to the output signal from the MRC-weighing algorithm 538, 638; and the output signal of the LLR 540, 640 is the Novel TDSIR MRC-signal 508, 608.

FIG. 3 can be considered as a receiver system that applies a TDSIR-procedure (TDSIR+MRC) for interference-cancellation (IC) with bit-metric (LLR) MRC-weighing, wherein the TDSIR-part 312 operates on time-samples.

FIG. 4 can be considered as a receiver system that applies a TDSIR-procedure (TDSIR+MRC) for interference-cancellation (IC) with bit-metric (LLR) MRC-weighing, wherein the TDSIR-part 412 operates on frequency-samples. In FIG. 4, the MRC-part is similar to that of FIG. 3, however, the TDSIR-part 412 operates now on "frequency-samples" after the Fast-Fourier-Transform (FFT) 404A, 404B.

FIG. 5 can be considered as a receiver system that applies a TDSIR-procedure (TDSIR+MRC) for interference-cancellation (IC) with sub-carrier-metric MRC-weighing, wherein the TDSIR-part 512 operates on time-samples. In FIG. 5 the MRC-weighing is based on "sub-carrier-metrics" and the TDSIR-part 512 operates on "time-samples".

FIG. 6 can be considered as a receiver system that applies a TDSIR-procedure (TDSIR+MRC) for interference-cancellation (IC) with bit-metric (LLR) MRC-weighing, wherein the TDSIR-part 612 operates with frequency-samples. In FIG. 6 the MRC-part is similar to that of FIG. 5, however, the TDSIR-part 612 operates now on "frequency-samples" after the FFT 604A, 604B.

Figure 13:
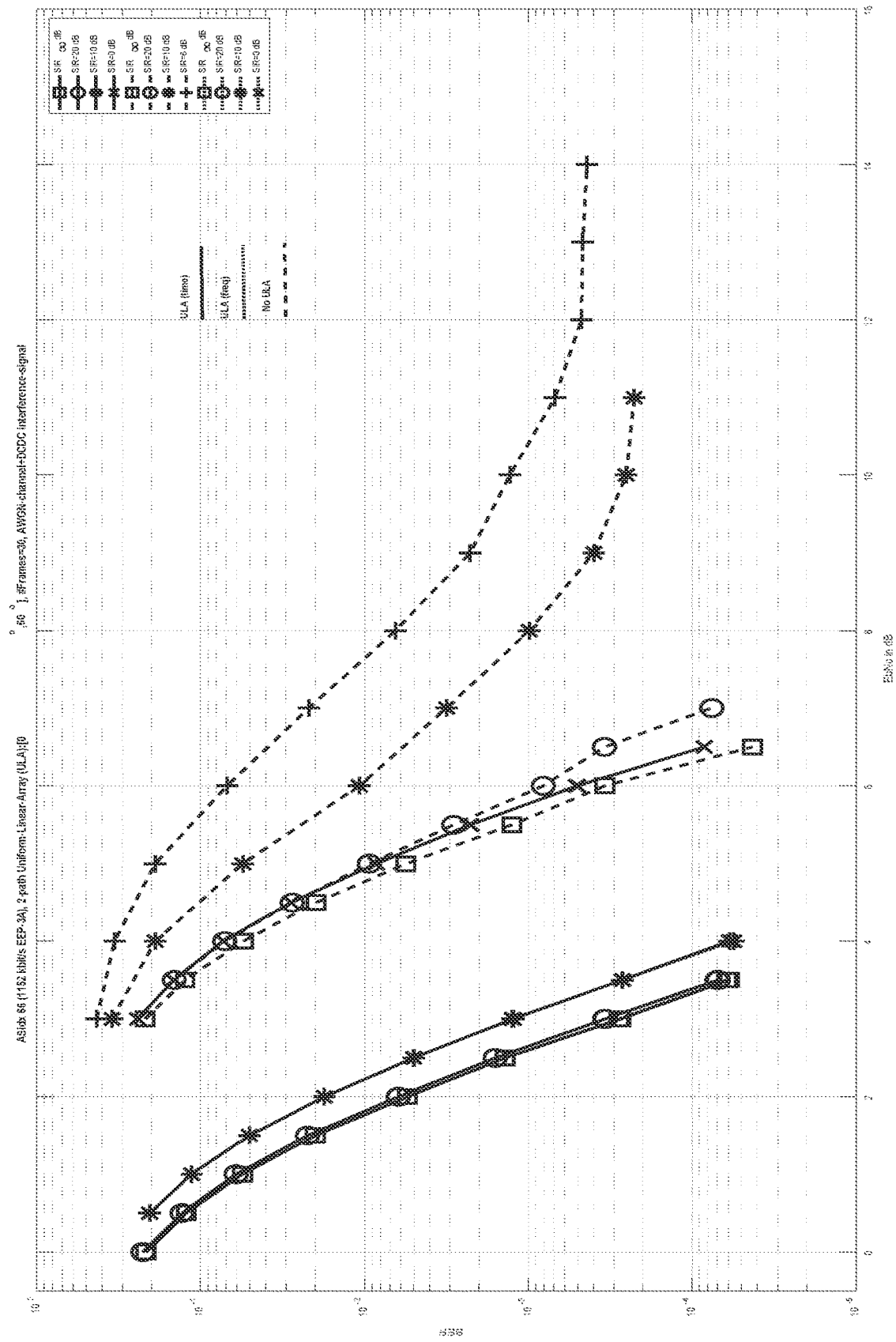
FIG. 13 shows plots of BER vs SNR for a DAB-transmission with DC-DC-converter interference-signal and AWGN.

As is known in the art, FFT stands for Fast-Fourier-Transform and represents the transformation of the time-domain into the frequency-domain. Hence, the TDSIR-part of the DAB-receiver might operate either in the time-domain on time-samples or in the frequency-domain on frequency-samples with the same mathematical procedures and similar results, as illustrated in FIG. 13.

We also reiterate here that, in addition to the TDSIR-part being capable of running in the frequency domain on the frequency-samples; it is possible for corresponding processing to be performed on null-subcarriers of each OFDM-symbol for interference-cancellation instead of the null-symbol of DAB.

The remainder of this technical description relates to a TDSIR-part of a DAB-receiver that operates in the time-domain, such as the receiver systems that are shown in FIG. 3 or FIG. 5, and as will be discussed in detail in Section 1.2.1, the MRC-part of the DAB-receiver operates in the frequency-domain.

For simplicity reasons, the details of the complete digital-radio DAB-receiver are left out in FIGS. 3 to 6.

To reduce interference rejection, due to for example electrical-cars, for DAB digital-radio broadcast-signals within a multiple-path (antennae) receiver-scenario the novel usage of different time-slots in a DAB-stream is utilised by examples disclosed herein. Disclosed herein is a novel time-division spatial interference-cancelation procedure especially for digital-radio DAB broadcast-signals. This time-division spatial interference-canceller for DAB can be referred to as "Time Division Spatial Interference Rejection (TDSIR)"-part of the TDSIR-procedure for a DAB-receiver. The principle of the TDSIR-part is that the received-power of each antenna is adjusted in phase so that the received DAB-signal of each antenna can be optimally combined in such a way that its power is constructively (coherently) added for the desired-signal and destructively (non-coherently) added for the interference-signals. In this document, this coherent and destructive combining is proposed in a unique and novel manner, and an example is described that is specific for DAB-streams. This unique novel way of suppression and combining is accomplished by the TDSIR-block 312, 512 in FIG. 3 and FIG. 5 of the proposed complete TDSIR-procedure (i.e., TDSIR-part plus MRC-weighing part, see FIG. 3 and FIG. 5). The TDSIR-part of the TDSIR-procedure can comprise: i) specific novel training-signals in specific time-slots of the DAB-stream, ii) computation of specific spatial-covariance-matrices (SCM) s, iii) a novel specific computation of an Eigenvalue-decomposition (EVD), iv) a specific time-division DAB training-signals based Principal-Component-Analysis (PCA) method that is capable of yielding the principal Eigenvector that gives the BF-weights, and v) a specific "time-division delay-sum DAB combiner" (BF)-process that can handle the weights of the PCA-method. The TDSIR-part of the TDSIR-procedure will be discussed in detail in Section 1.2.1. In addition, in examples of the proposed TDSIR-procedure disclosed in this document, the output-signal of the TDSIR-part can be applied as an input to the MRC-weighing-part, as can be seen in FIG. 3 and FIG. 5.

The principle of MRC is that the received-power of each antenna is controlled in such a way that it is constructively (coherently) added. However, due to the fact that MRC is, by definition, only capable of combining the power that is collected by each path (antenna) it's; i), performance is limited by the fact that a receiving-path (antenna) receives stronger electromagnetic waves in some directions than in others, i.e., it is a non-ideal omni-directional antenna and ii) not capable of (controlled) suppression of undesired-signals.

The inventor proposes, in this document, a novel time-division based procedure, to improve the reception of transmitted digital-radio DAB broadcast-signals by multiple-(path)antennae, i.e., an Uniform-Linear-Array (ULA) consisting of two paths (isotropic-antennae), with time-division electronically steered beam-forming (BF) by using specific time-slots in the complex base-band DAB-signal stream, this for interference-signal rejection, i.e., interference-cancellation (IC), as an extra IC-(input) path into "conventional-MRC". Because conventional-MRC is performance-wise limited by directionality and has no undesired-signal suppression capabilities, the proposed time-division electronically steering of the digital-radio DAB broadcast-signals is based on (estimated) phase-shifts and (estimated) amplitudes of multiple received-signals on the ULA. The control of the sensitivity and the rejection of energy with the usage of complex base-band signals with phase-estimations and with amplitude-estimations is known as; electronically-steered complex base-band delay-sum beam forming. This kind of beam forming also enables "null-steering" to suppress (or remove) interference signals. To suppress, for example, possible co-channel DC-DC-converter interference-signals from an electrical-car for a digital-radio DAB broadcast-transmission. Moreover, the time-division spatial interference rejection, also known as the TDSIR-procedure that consists of a TDSIR-part and MRC-weighing-part, enables co-channel-interference cancellation (CIC) of a wide-variety of co-channel interference-signals caused by, for example, electrical-vehicles in Band-III as well as in the L-Band for a digital-radio DAB broadcast-transmission.

Therefore, in this document, the inventor proposes the novel TDSIR-procedure in combination, i.e., an extra input-path, with conventional-MRC specifically applicable to DAB-stream transmissions. The TDSIR-part of the TDSIR-procedure is based on a novel time-division (digitally-computed) delay-sum DAB combining (BF) process, which consists of i) extracting of the DAB-streams in specific time-periods, i.e., time-division, novel training-signals by the usage of specific DAB-stream symbols that are: the NULL-symbol and OFDM-symbols, ii) computing specific time-division spatial-covariance-matrices (SCM)s, applying novel specific time-division based Eigenvalue-decompositions (EVD)s where a novel specific time-division based Principal-Component-Analysis (PCA) method provides the novel time-division based principal Eigenvector for the weights of the energy steering, i.e. the coherent-addition of the desired-signal as well as the rejection of the undesired interference-signal for the discretized DAB-baseband-signal streams. Moreover, the MRC-weighing-part of the TDSIR-procedure can combine, in an optimal way Z(S)INR-sense (Z(SINR will be discussed in more detail below), the interference cancelled DAB-baseband-signal with the MRC-signals received by a multiple-path (antennae) system, as we will discuss in detail in Section 1.2.1. However, before providing further details on the TDSIR-part of the TDSIR-procedure the Digital Audio Broadcasting (DAB)-system will be introduced in Section 1.1.

1.1 Digital Audio Broadcasting (DAB)-System

FIG. 7 shows a physical time-frame, i.e., transmission-frame, for DAB decoding. The decoding part gets, for example, its input data from a baseband data file (synchronized complex I/Q data, sampled with 2.048 MHz comprising a NULL-Symbol and a TFPR symbol).

The Digital Audio Broadcasting (DAB)-system comprises (on a high(er)-level):
FFT processing for the NULL-Symbol, TFPR-Symbol and Data-Symbols (FIC and MSC-data),
Differential-Demodulation,
Metric-Generation,
Frequency De-Interleaving,
Time De-Interleaving for MSC-data,
Error-Profiling, Viterbi-Decoding, and Error-tracking,
Energy-Descrambling,
CRC-processing for FIC-data.

The data processing might be done on symbol base and after time-de-interleaving (frequency de-interleaving for FIC-data) on frame base. That means, all symbols of FIC-data or MSC-data of a frame (MSC-data logical frame) might be pre-processed before the error profiling and Viterbi-decoding of the FIC/MSC-data starts. FIC and MSC-data processing might be processed sequentially.

Receive Symbol procedure: an expected number of samples might be read from an input file. OFDM-symbol might be limited to the length of their FFT by guard-removal. Moreover, the OFDM-symbol length depends on the selected DAB-mode (2048, 512, 256 or 1024 complex input data for DAB I, II, III or IV).

FFT Processing procedure: time domain signal will be transformed into the frequency domain by a Fast-Fourier-Transformation (FFT).

NULL-Symbol procedure: might perform TII-decoding and synchronization in the synchronization part as part of the received input data.

TFPR-Symbol procedure: might obtain the first reference symbol for the differential-demodulation procedure.

Differential-Demodulation procedure: might determine the phase difference with respect to the previous symbol for each carrier of the current symbol.

Metric-Generation procedure: might derive a (quantized) bit-metric for soft-decision Viterbi-decoding from the result of the differential-demodulation.

Frequency De-Interleaving procedure: might take place after the metric-generation, i.e., bit-metrics are de-interleaved.

CU-Selection procedure: might be only applying to the MSC data. Only CUs of selected sub-channels might be delivered to succeeding data processing starting with the time de-interleaving procedure.

Time De-Interleaving procedure: might be only processing CUs belonging to selected sub-channels and might be performed on symbol-basis.

Error-Profiling & Viterbi-Decoding procedure: error-profiling might prepare an input data-stream for Viterbi-decoding. Depending on the sub-channel profile, the received bit-metrics might be extended by zeros (de-puncturing). At the end of the FIC and MSC-data channel the closing trellis are processed and the Viterbi-decoder is flushed by providing zeros with a code rate of ¼ into the decoder. The decoded data might be re-encoded and might be compared to the received bit-metrics.

Energy-De-Scrambling procedure: might be applied to the FIC-data and to the selected MSC-sub-channels and might be processed on frame base. The data is scrambled bit-by-bit with a pseudo-random-binary-sequence (PRBS).

CRC-Processing procedure: Cyclic-Redundancy-Check (CRC) might be processed for every Fast-Information-Block (FIB) of the Fast-Information-Channel (FIC).

Figure 8:
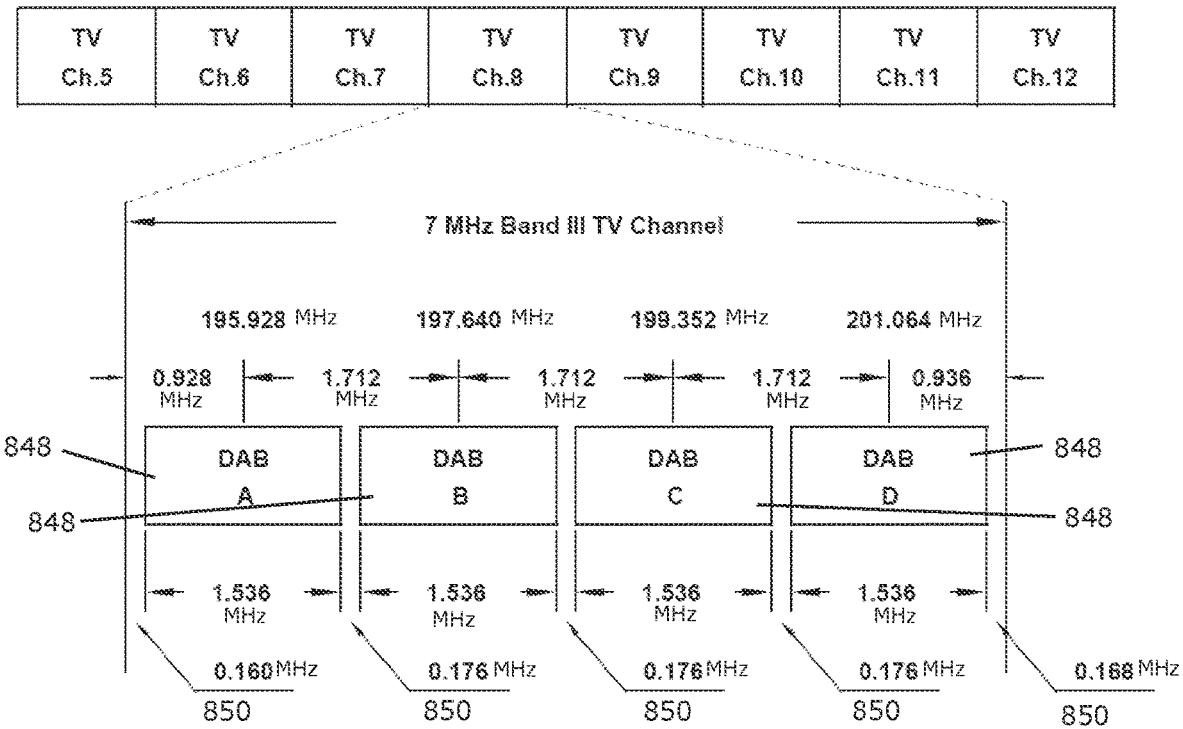
FIG. 8 shows an example of a DAB channeling plan.

FIG. 8 shows an example of a DAB channeling plan.

The above-mentioned procedures for a DAB-receiver are applicable for a complex baseband input-stream. The reference frequency, corresponding to the carrier for which k=0, should appear at 0 kHz (DC) in the complex-baseband signal. Previous processing stages, for example analogue filtering with Digital-Down-Conversion (DDC), are expected to apply filtering that is 1.712 MHz wide, accordingly to the DAB-channel-grid and centered on DC in the complex-baseband. For example, the DAB channeling plan in the VHF-III (174-230 MHz) band is shown in FIG. 8.

In FIG. 8, four DAB channels (channels A, B, C and D) 848 are shown in a 7 MHz frequency band. Each channel 848 occupies a frequency range of 1.536 MHz. A set of null-carriers 850 is located between adjacent channels 848. The null-carriers 850 are included to assist with the separation of adjacent channels 848, as is known in the art. The null-carriers 850 can represent predetermined frequencies between adjacent channels 848. In this example, three of the sets of null-carriers 850 have a frequency range of 0.176 MHz, one set of null-carriers 850 has a frequency range of at least 0.160 MHz (it will be appreciated that the null-carriers at the edge of one band may be adjacent to null-carriers at the adjacent edge of a neighbouring band), and another set of null-carriers 850 has a frequency range of at least 0.168 MHz.

One or more of the null-carriers 850 shown in FIG. 8 are examples of undesired-signal-components that are described above, in that they represent frequencies at which an input-signal does not contain any transmitted data. One or more of the DAB channels 848 represent frequencies at which the DAB input-signal contains transmitted data. It will be appreciated that the null-carriers 850 that are shown in FIG. 8 are not restricted to DAB signals—similar null-carriers can be used with any other type of OFDM signalling.

1.2 Time-Division Spatial Interference Rejection (TDSIR)

A time-division based spatial interference rejection procedure for the reception of DAB-streams comprises, firstly, a TDSIR-part that can comprise one or more of the following: i) novel specific time-division training-signals, ii) specific spatial-covariance matrices (SCM)s, iii) novel specific Eigen-value decompositions (EVD)s of these matrices, iv) a specific time-division based Principal-Component-Analysis (PCA) method providing the novel time-division based principal Eigenvector for the weights, v) a specific delay-sum DAB combiner (BF)-process that can handle the time-division based weights, and secondly, vi) an MRC-weighing part. Obtaining the necessary weights is accomplished by the TDSIR-part of the proposed TDSIR-procedure, which maximizes a novel profit-function, i.e., the Z(S)INR, with multiple DAB-streams (i.e., at least two-paths). The output-stream of the TDSIR-part is combined with the conventional MRC input-streams in the MRC-weighing-part, as can be seen in FIGS. 3 and 5, which then, finally, leads to the newly proposed TDSIR-procedure disclosed in this document. The TDSIR-part will be discussed in detail Section 1.2.1.

1.2.1 Time-Period Based DAB Combining (BF) by Maximization of the Novel "ZINR Profit-Function"

In Section 1.1 the DAB-system was described, and as can be seen from FIG. 8, the DAB-channels are separated with a rather small space of 176 kHz between neighbouring channels. Note, that the channel-grid of a DAB-transmission in Band-III is 1712 kHz by regulation. Due to the fact that the DAB channels are quite close, they are susceptible to interference by the neighbouring channels, i.e. the/st-adjacent DAB-interference. In addition to the 1st adjacent distortion on the DAB signal it is also possible that distortions on the same carrier-frequency can occur due to other DAB-stations, i.e., co-channel interference. This co-channel interference is, for example, caused by the mis-alignment between the frequency-planning and the sensitivity of (mid- and high-end) DAB-receivers. However, examples disclosed herein are especially interesting for the rejection of other distortions like the ones that are initiated by electrical-vehicles, for example, from a DC-DC-converter. These kinds of distortions are indeed noticed and showing-up in the DAB-transmission-bands, and especially band-III, as severe co-channel interference contaminating the complete-spectrum of the DAB-channel.

Examples of the TDSIR-procedure that is proposed in this document have the objective to remove, or at least reduce, interference-signals of a DAB-transmission by the usage of multiple-paths (antennae). Advantageously this can be achieved with only two-paths (antennae) for reasons of low complexity and costs. Note, that MRC in itself may not be capable of removing or reducing interference-signals because MRC is only optimally combining the total received signal-energy including the interference-signal energies. However, since the desired DAB-signal and possible interference-signals generated by, for example, an electrical-vehicle are, most probably, coming from different locations and in general are slowly changing, it has been found examples described herein can effectively reduce them. Hence, a third-dimension (where time and frequency are the first two dimensions), "the space-dimension", can be exploited by a novel specific beam forming like approach. This spatial-domain approach can then remove the extremely-wide varying interference-signals caused by, for example, electrical vehicles.

Figure 9:
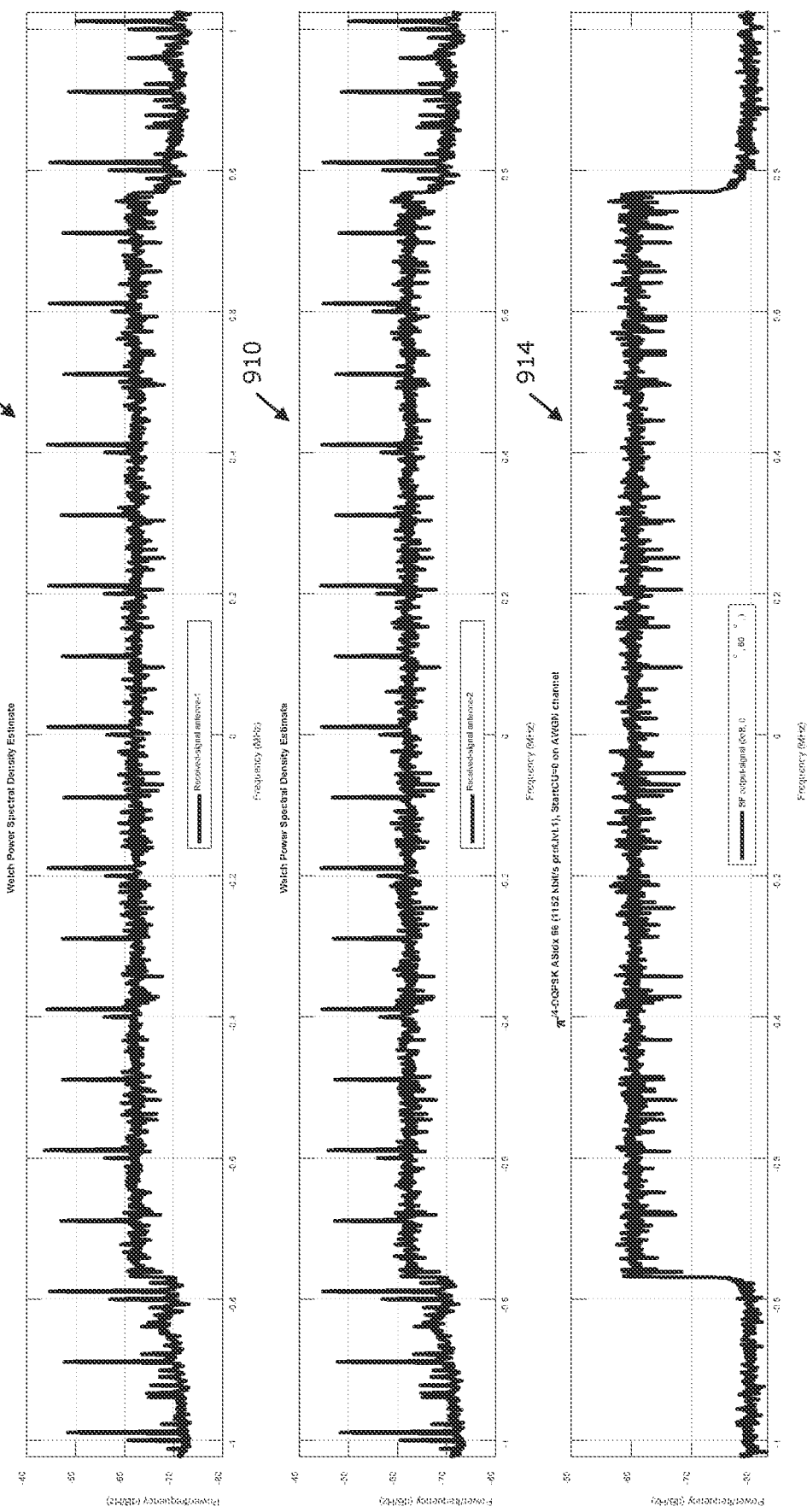
FIG. 9 shows power spectral density plots of three signals in an example embodiment of a receiver system.

FIG. 9 shows power spectral density plots of three signals in an example embodiment of a receiver system.

The upper and middle plots in FIG. 9 are examples of signal-processing-path-output signals 910 of FIG. 1 that are provided as input signals to signal-combiner such as an MRC block. These signal-processing-path-output signals 910 are DAB-signals with a DC-DC-converter interference-signal.

The lower plot in FIG. 9 is an example of a spatial-output-signal 914 of FIG. 1, which can be provided by a spatial-information-processing-block/TDSIR-part. The spatial-output-signal 914 in this example can be considered as a spatially-corrected DAB-combiner (BF)-output-signal.

The signal-processing-path-output signals 910 of FIG. 9 are examples of input signals of the spatial-information-processing-block/TDSIR-part, and the spatial-output-signal 914 is an example of output signal of the spatial-information-processing-block/TDSIR-part. FIG. 9 shows the summation of a DAB-transmission with a (recorded) co-channel interference-signal in Band-III. This co-channel interference-signal is generated by a DC-DC-converter of an electrical-vehicle in this example. It can be seen from FIG. 9 that the interference-signal is contaminating the complete DAB-transmission-spectrum. This interference-signal will severely degrade or even completely block the reception of the transmitted/desired data and the audio within a DAB-stream.

The upper plot in FIG. 9 shows the distortion of the DAB-signal on the 1st antenna, with a recorded, in an electrical-car, co-channel interference signal generated by a DC-DC-converter that was located under the passenger-seat.

Figure 10:
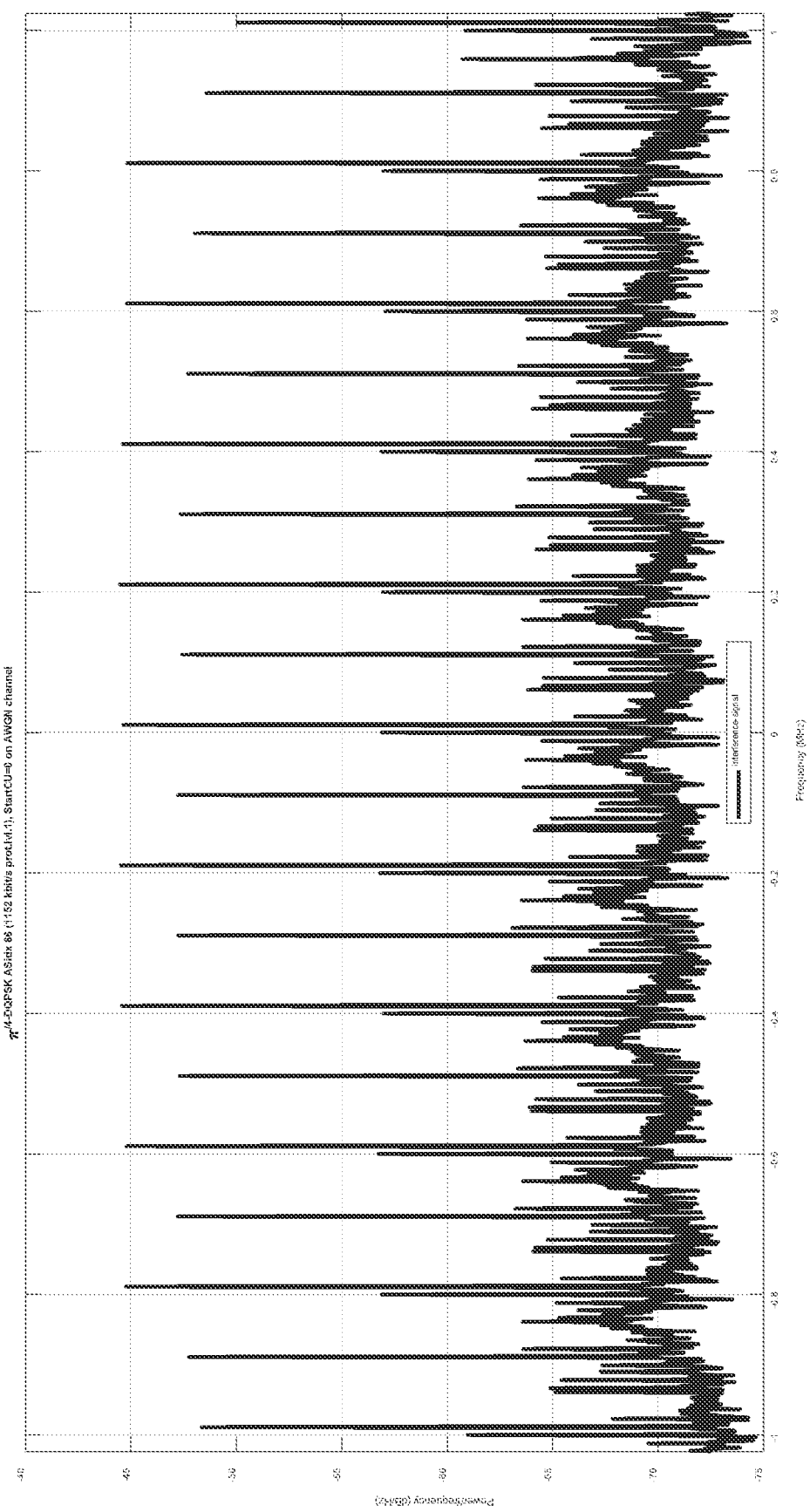
FIG. 10 shows a power spectral density plot of the co-channel interference-signal generated by a DC-DC-converter of an electrical car (recording), which is present in the plots of FIG. 9.

FIG. 10 shows a power spectral density plot of the co-channel interference-signal generated by a DC-DC-converter of an electrical car (recording), which is present in the plots of FIG. 9.

Returning to FIG. 9, it can be clearly seen that the DC-DC-converter interference-signal is a spectral-rich signal, i.e., there is significantly varying energy-levels in the whole frequency-band. Note, this is just one of the most-probably extremely large set of wide-varying possible interference-signals generated within or by electrical-vehicles.

The middle plot in FIG. 9 shows the received distorted signal on the $2^{nd}$-antenna.

Finally, the lower plot 914 of FIG. 9 shows the output of a time-division electronically steered DAB-combiner (BF), also known as a TDSIR-part in various examples of this document. It can be seen that the SNIR for the lower plot 914 is much better than for the upper and middle plots 910. This is evident from the difference between the power of the transmitted components of the signal (between −768 MHz and +768 MHz) and the power of the undesired frequency components (less than −768 MHz, and greater than +768 MHz).

Figure 11:
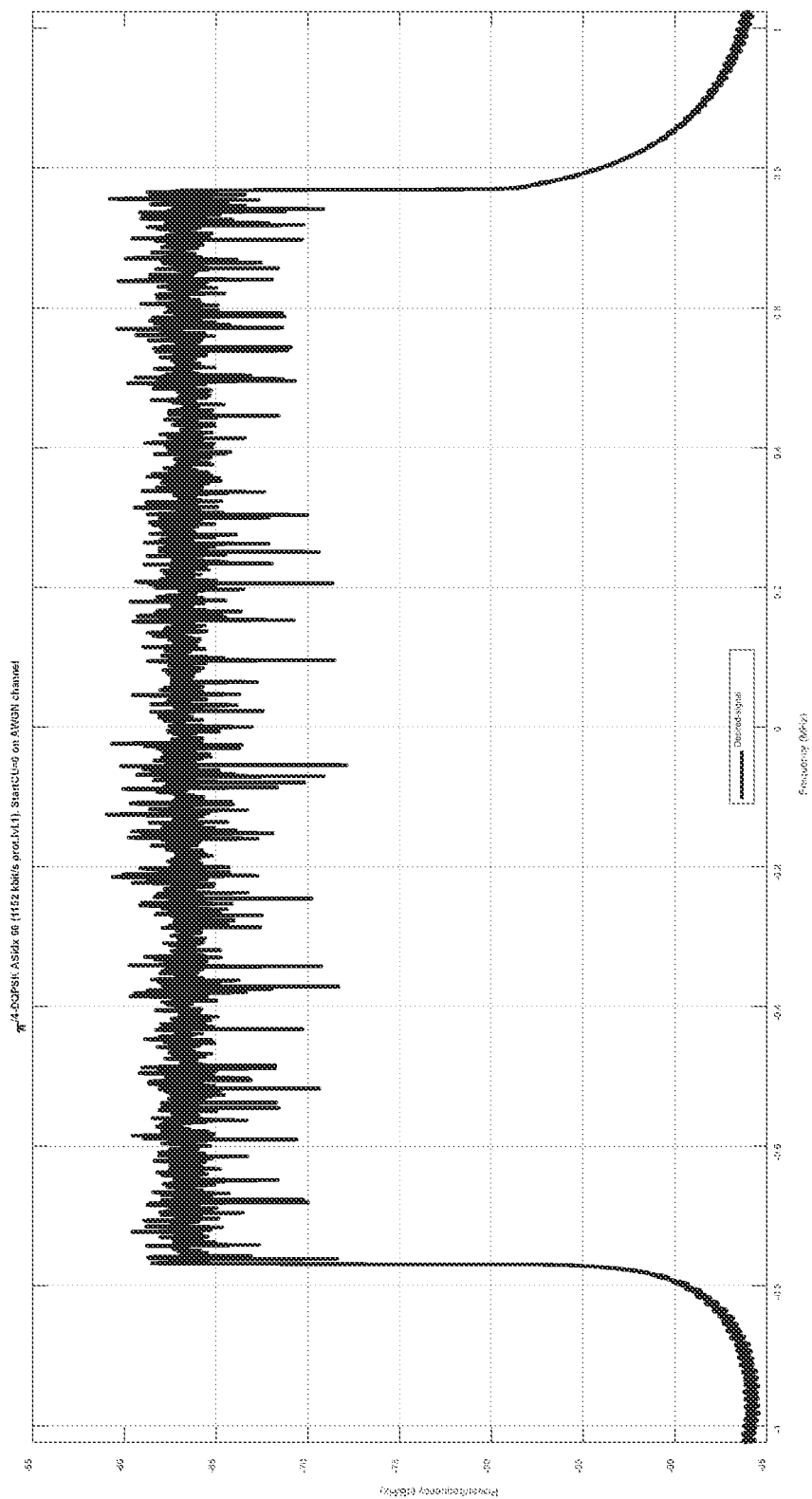
FIG. 11 shows a power spectral density plot of the transmitted (desired) DAB-signal.

FIG. 11 shows a power spectral density plot of the transmitted (desired) DAB-signal.

If we compare the lower plot of FIG. 9 signal with the desired DAB-signal of FIG. 11, then it can be clearly seen that the spatial-information-processing-block/TDSIR-part significantly reduces the co-channel interference-signal introduced by the DC-DC-converter of the electrical-vehicle. The effects of this co-channel interference-signal are very visible in the signal-processing-path-output signals 910 in the upper and middle plots of FIG. 9, as the spectral-spikes generated by the DC-DC-converter.

In addition, it can also be seen from FIG. 9 that the received-signal (the signal-processing-path-output signals 910), i.e., the input-signal to the TDSIR-part, is indeed a summation of the co-channel interference-signal (i.e., DC-DC-converter interference-signal of FIG. 10) and the desired-signal (i.e., the transmitted DAB-signal of FIG. 11). However, both the interference-signal and the desired-signal originate from geographically different locations, i.e. there is space-diversity. Now, it is the task of TDSIR-part to separate the two different signals, i.e. the desired DAB-signal and the un-desired co-channel DC-DC-converter interference-signal, by their spatially different information ("spatial-signature").

Examples of the DAB TDSIR-part that that are disclosed herein are able to remove, or at least significantly reduce, the co-channel DC-DC converter interference signal by null-steering with an ULA that, with in an optimal setting, would consist of two isotropic antennae that are spaced by half a wave-length $\lambda/2$. However, advantageously, the TDSIR-procedure (TDSIR-part plus MRC-weighing-part) is quite robust against a non-optimal set-up, i.e., non-isotropic antennae and at distances other than $\lambda/2$). Examples of the novel TDSIR-part exploit the fact that the un-desired co-channel interference-signal and the desired DAB-signal are separated in at least two different time-slots, which is indeed the case in the DAB transmission-system. An example of a time-slot for the co-channel interference-signal is the "NULL-symbol", and examples of the separate time-slots for the desired-signal are the successive OFDM-symbols of a DAB-transmission-frame. However, these successive OFDM-symbols still also include the interference-signal and the noise. Note that the DAB-transmission-frame structure is shown in FIG. 7.

In the next section, we will discuss the basic-concept of the novel TDSIR-part that is exploiting spatial-information by time-division of the "undesired-signal", i.e., NULL-symbol time-slot and the "desired+undesired-signal", i.e., each individual successive OFDM-symbol time-slot in a transmission-frame.

As can be seen from FIG. 9, the base-band of the received radio signal occupies a bandwidth of roughly 1712 kHz, i.e., between −856 kHz and +856 kHz. This received-signal includes the desired DAB-signal, which occupies 1536 kHz between −768 kHz and +768 kHz. Note that the received-signal, i.e. the input-signal of the beam-former, can also include the co-channel interference signals from, for example, a DC-DC-converter of an electrical-vehicle as well as interference-signals from one or two 1st adjacent received DAB-signals. This is due to the fact that these 1st adjacent DAB-signals have a relatively small spacing of 176 kHz from the spectrum of the desired DAB-signal. Note, as we have already described, that a co-channel interference-signal can be any undesired-signal, i.e. it is a very wide-range in time and frequency of possible signals, that occupies the same frequency-spectrum as the desired DAB-signal.

Figure 12:
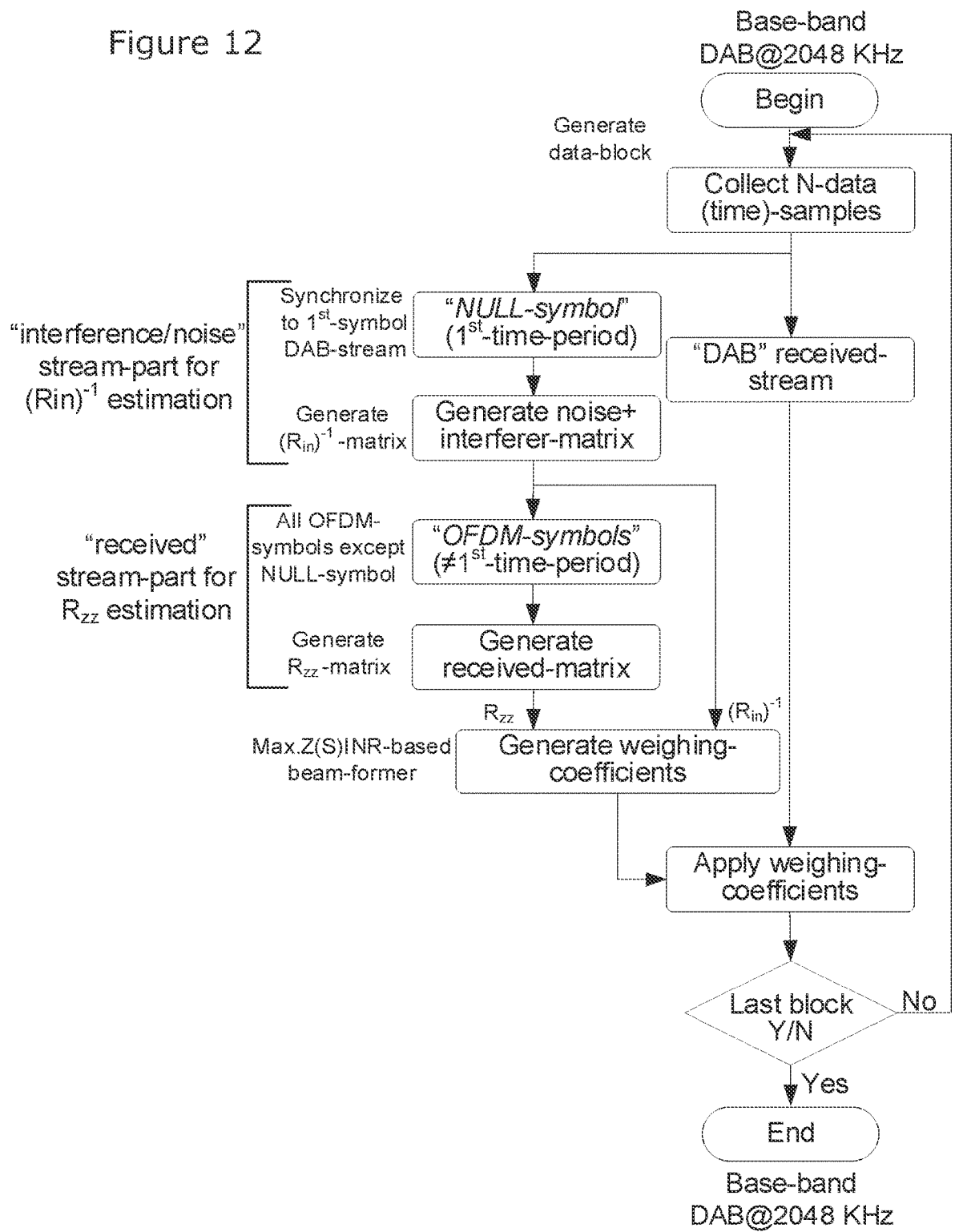
FIG. 12 shows an example embodiment of a method of time-division, i.e., NULL- and OFDM-symbol time-periods, interference rejection by Time-Division Spatial Interference Rejection (TDSIR)

Now, in an example of the novel time-division TDSIR-part of the TDSIR-procedure we, firstly, use (a portion of) the NULL-symbol to obtain training-signals or surrogate-signals (representatives) for the "undesired-signal", i.e., for the interference-signals and the thermal-noise-signal. Thus the "spatial-energy" of the NULL-symbol represents the spatial-energy of the interference-signals and the thermal noise-energy and can, therefore, be used to obtain information about the sum of the interference-energy (I) and the noise-energy (N), i.e., the (I+N) component of the DAB-transmission. Note that this is without the desired DAB-signal-energy (S). Secondly, complementary to the NULL-symbol, the successive OFDM-symbols of the received DAB-frame contain the desired DAB-signal-energy (S). Therefore, they are used to obtain training-signals for the "desired+undesired-signal" (Z=S+I+N), i.e., the OFDM-symbols contain spatial energy for the desired DAB-signal (S) plus the interference-signals plus thermal noise-signal (I+N). The TDSIR-part will exploit with time-division the spatial energy Z of the OFDM-symbols and the spatial-energy (I+N) of the NULL-symbol to reduce the co-channel interference-signal energy generated by for example a DC-DC-converter of an electrical-vehicle, as can be seen in FIG. 12 and will be described below. In the next section, it will be described how the novel TDSIR-part for DAB-transmissions can (indirectly) obtain also optimal-weights for interference-signal suppression by maximization of an SINR-profit-function, however, with a novel and specific profit-function specialized to DAB-transmissions.

FIG. 12 shows an example embodiment of a method of time-division, i.e., NULL- and OFDM-symbol time-periods, interference rejection by TDSIR.

The upper-part in FIG. 12 shows the surrogate of the interference-signals plus noise (I+N), i.e., the "interference/noise" stream and is obtained from the NULL-symbol time-period. These are examples of undesired-signal-components. The lower-part in FIG. 12 shows the surrogate of the received (desired+interference+noise)-signal, i.e., the "received" stream. These are examples of combined-signal-components. This is obtained, for example, with the Time-Frequency-Phase-Reference (TFPR)-symbol time-period but it can be any other OFDM-symbol in the DAB-transmission-stream, i.e., FIC and MSC symbols, see FIG. 7. Note that within the received signal; the desired-signal (S), the interference-signals (I), and the thermal-Noise-signal (N) are all present, i.e., $$Z \stackrel{def}{=} S + I + N \qquad \text{Eq. 1}$$

The surrogates of the interference+noise-signal (I+N) and the received-signal (Z=S+I+N), go into TDSIR-part of the TDSIR-procedure. The novel TDSIR-part calculates/estimates the weights that maximize the novel "ZINR-profit-function; Signal+Interference+Noise-to-Intefference+Noise Ratio (ZINR)", i.e., $$ZINR \stackrel{def}{=} \frac{S+I+N}{I+N} = \qquad \text{Eq. 2}$$
$$\frac{S}{I+N} + 1 = SINR + 1 \rightarrow \text{argmax } ZINR \propto \text{argmax } SINR$$

The computations of the weights is based on the inverse of the (sample) co-variance matrix of the interference plus noise signal, ($R_n^{-1}$), and the (sample) co-variance matrix of the received-signal, $R_{zz}$. Moreover, the weights can be computed quickly/instantaneously, i.e., by the so called; "estimation-and-plug" techniques by solving an eigenvalue problem with the "Principal-Component-Analysis" (PCA) method. Consequently, the proposed time-division TDSIR-part of the TDSIR-procedure is fast, i.e., it has a low-latency.

In this way, with reference to FIG. 1, the spatial-information-processing-block 112 can calculate the spatial-information of the undesired-signal-components of the plurality of input-signals by determining a spatial covariance matrix for the undesired-signal-components; and can calculate the spatial information of the combined-signal-components of the plurality of input-signals by determining a spatial covariance matrix for the combined-signal-components.

With, for example, the interference plus noise signal and the two path (antennae) there are two weights, i.e., two complex-numbers, computed/estimated by the TDSIR-part. These two estimated complex-numbers (representing amplitude and phase estimates) are for removal of the interference-signals and also keeping the desired-signal, this is shown by the "apply weighing-coefficients" in the lower-part of FIG. 12.

The estimation-criterion is the maximization of the "profit-function: ZINR", indirectly the maximization of the "profit-function: SINR" as can be seen by (Eq. 2). The maximization of the ZINR profit-function computes the optimal weights by taking the first derivative of the ZINR, setting the result of this derivation to zero and solving the equation. We will show this in remainder of this section.

The ZINR is given by;

$$ZINR \stackrel{def}{=} \frac{\underline{w}^H R_{zz} \underline{w}}{\underline{w}^H R_{in} \underline{w}} = \frac{\underline{w}^H (E\{\underline{s}[n] + (\underline{i}[n] + \underline{n}[n])\} \cdot \{\underline{s}[n] + (\underline{i}[n] + \underline{n}[n])\}^H) \underline{w}}{\underline{w}^H R_{in} \underline{w}} = \frac{\underline{w}^H (R_{ss} R_{is} + R_{si} + R_{in}) \underline{w}}{\underline{w}^H R_{in} \underline{w}} \cong \frac{\underline{w}^H R_{ss} \underline{w}}{\underline{w}^H R_{in} \underline{w}} + 1 \stackrel{def}{=} SINR + 1 \qquad \text{Eq. 3}$$

Where vector $\underline{w}$ are the weights, $(\bullet)^H$ is the Hermitian transpose, i.e., apply both the complex-conjugate and the transpose operation and vector $\underline{n}[n]$ is complex-Gaussian noise with zero-mean and variance $\sigma^2=N_0$ for each vector-component. Moreover, the equality-approximation assumes that the interference-signal vector $\underline{i}[n]$ is independent of the zero-mean desired-signal vector $\underline{s}[n]$ with variance $\sigma_s^2$ for each vector-component and the zero-mean complex-Gaussian noise $\underline{n}[n]$ and, hence, where, $$R_{zz} \stackrel{\Delta}{=} \frac{1}{N} \sum_{n=1}^{N} (\underline{z}[n] \cdot \underline{z}^H[n]), \qquad \text{Eq. 4}$$

$$R_{is} \stackrel{\Delta}{=} \frac{1}{N} \sum_{n=1}^{N} (\{\underline{i}[n] + \underline{n}[n]\} \cdot \underline{s}^H[n]) \stackrel{def}{=} 0,$$

$$R_{si} \stackrel{\Delta}{=} \frac{1}{N} \sum_{n=1}^{N} (\underline{s}[n] \cdot \{\underline{i}[n] + \underline{n}[n]\}^H) \stackrel{def}{=} 0,$$

$$R_{in} \stackrel{\Delta}{=} \frac{1}{N} \sum_{n=1}^{N} (\{\underline{i}[n] + \underline{n}[n]\} \cdot \{\underline{i}[n] + \underline{n}[n]\}^H)$$

are the sample co-variance matrices, i.e., an approximation of the co-variance matrices over a finite number of samples N (note, $R_{is}$ and $R_{si}$ are set to zero as described above).

In the practical case the (sample) co-variance matrix $R_{in}$ is often (normally) not available. However, for a DAB transmission, thanks to the NULL-symbol, it is possible to use a surrogate-signal to obtain an approximation of the (sample) co-variance matrix $R_{in}$, which gives;

$$R_{in} \approx R_{\hat{i}\hat{n}} \stackrel{\Delta}{=} \frac{1}{N} \sum_{n=1}^{N} (\{\hat{\underline{i}}[n] + \hat{\underline{n}}[n]\} \cdot \{\hat{\underline{i}}[n] + \hat{\underline{n}}[n]\}^H) \quad \text{interference NULL- signal symbol} \qquad \text{Eq. 5}$$

$$R_{zz} \approx R_{\hat{z}\hat{z}} \stackrel{\Delta}{=} \frac{1}{N} \sum_{n=1}^{N} (\hat{\underline{z}}[n] \cdot \hat{\underline{z}}^H[n]) \quad \text{received OFDM- signal symbol}$$

where $\hat{\underline{i}}[n]+\hat{\underline{n}}[n]$ is the stream of vector(multi-path(antennae))-samples for the surrogate of the NULL-symbol interference-signal and $\hat{\underline{z}}[n]=\hat{\underline{s}}[n]+\hat{\underline{i}}[n]+\hat{\underline{n}}[n]$ is the stream of vector(multi-path(antennae))-samples for the surrogate of the received OFDM-symbol signal. A DAB transmission with an interference signal and complex-Gaussian noise might be seen as two spatially different and independent signals, i.e., the desired(DAB)-signal (S) and the undesired-signal, which is the summation of the interference-signal and the thermal-noise (I+N) so, the SINR for a DAB-transmission with multi-paths(antennae) reception becomes;

$$SINR_{DAB} \stackrel{def}{=} E\left\{\frac{\underline{w}^H R_{ss} \underline{w}}{\underline{w}^H R_{in} \underline{w}}\right\} \cong E\left\{\frac{\underline{w}^H R_{zz} \underline{w}}{\underline{w}^H R_{in} \underline{w}}\right\} - 1 \qquad \text{Eq. 6}$$

where $E\{\bullet\}$ means statistical average. The optimum weighing-coefficients, i.e., the weight-vector can be obtained by maximizing the SINR (as described in Van Trees, H. Optimum Array Processing. New York: Wiley-Interscience, 2002, pp. 450-452);

$$\underline{w}_{opt} \stackrel{def}{=} \arg\max_{\underline{w}}\{SINR\} = \arg\max_{\underline{w}}\left\{\frac{\underline{w}^H R_{zz} \underline{w}}{\underline{w}^H R_{in} \underline{w}} - 1\right\} \qquad \text{Eq. 7}$$

To solve this maximization problem, we take the complex gradient of the SINR (based on the time division time periods, i.e., NULL-symbol respectively TFPR-symbol), with respect to the complex-weights and setting the result to zero, this yields;

$$\nabla_{\underline{w}^H}\left\{\frac{\underline{w}^H R_{zz} \underline{w}}{\underline{w}^H R_{in} \underline{w}} - 1\right\} = \nabla_{\underline{w}^H}\left\{(\underline{w}^H R_{zz} \underline{w})(\underline{w}^H R_{in} \underline{w})^{-1}\right\} = 0 \qquad \text{Eq. 8}$$

where $\nabla\{\bullet\}$ means take the complex gradient. By applying partial-differentiation, this gives;

$$R_{zz}\underline{w}(\underline{w}^H R_{in} \underline{w})^{-1} - (\underline{w}^H R_{in} \underline{w})^{-2} R_{in} \underline{w}(\underline{w}^H R_{zz} \underline{w}) = 0 \qquad \text{Eq. 9}$$

and can be rewritten as;

$$R_{zz}\underline{w}(\underline{w}^H R_{in} \underline{w})^{-1} = (\underline{w}^H R_{in} \underline{w})^{-2} R_{in} \underline{w}(\underline{w}^H R_{zz} \underline{w}) \Rightarrow R_{zz}\underline{w} \frac{\underline{w}^H R_{zz} \underline{w}}{\underline{w}^H R_{in} \underline{w}} \stackrel{\Delta}{=} R_{in}\underline{w}\lambda \qquad \text{Eq. 10}$$

where we defined;

$$\lambda = \frac{\underline{w}^H R_{zz} \underline{w}}{\underline{w}^H R_{in} \underline{w}} = \frac{\underline{w}^H (R_{ss} R_{is} + R_{si} + R_{in}) \underline{w}}{\underline{w}^H R_{in} \underline{w}} \cong \frac{\underline{w}^H (R_{ss} + R_{in}) \underline{w}}{\underline{w}^H R_{in} \underline{w}} = \frac{\underline{w}^H R_{ss} \underline{w}}{\underline{w}^H R_{in} \underline{w}} + 1 \stackrel{def}{=} \frac{s}{i+n} + 1 \qquad \text{Eq. 11}$$

as the ZINR for the DAB-transmission with an interference-signal and thermal-noise (i.e., SINR+1). Now by some rewriting we get;

$$R_{zz}\underline{w} = R_{in}\underline{w}\lambda \Rightarrow (R_{in}^{-1}R_{zz})\underline{w} = \lambda\underline{w} \qquad \text{Eq. 12}$$

which is what is required to solve an Eigen-value problem. The solution of the Eigen-value problem can provide the optimal-weights for maximizing the ZINR-profit-function (thus, also the maximization of SINR-profit-function) and is given by;

$$\underline{w}_{opt} = P\{R_{in}^{-1}R_{zz}\} \qquad \text{Eq. 13}$$

where P{•} is the operator that returns the principal Eigen-vector of a matrix via the Principle-Component-Analysis (PCA)-method that computes the principal Eigen-vector by subtraction of the obtained Eigen-value from a column of the Spatial-Covariance-Matrix (SCM), according to the Cayley-Hamilton theorem.

In this way, with reference to FIG. 2, the spatial-information-processing-block 212 can calculate the weighting-coefficients 226 for each of the input signals 203A, 203B by applying a profit function to the spatial information 220, 222 of the combined-signal-components and the spatial information of the undesired-signal-components. More particularly, the weighting-coefficient-calculator 224 can calculate the weighting-coefficients 226 for each of the input signals 203A, 203B by maximising a SINR profit function, wherein: the spatial information 220 of the combined-signal-components represents the S of the SINR profit function; and the spatial information 222 of the undesired-signal-components represents the IN of the SINR profit function. In this way, the spatial-information-processing-block 212 can calculate the weighting-coefficients 226 for each of the input signals 203A, 203B by: a) determining the power of the spatial information 220 of the combined-signal-components; b) determining the power of the spatial information 222 of the undesired-signal-components; and c) maximising the ratio of: i. the power of the spatial information of the combined-signal-components; to ii. the power of the spatial information of the undesired-signal-components. As discussed above, in some examples this can be considered as performing electronically-steered complex [base-band] delay-sum beam forming on the undesired-signal-components and the combined-signal-components of the plurality of input-signals in order to provide a spatial-output-signal 214.

Now, with a two-path (antennae ULA), the sample-covariance matrix is a 2-by-2 matrix and the characteristic-function to compute the Eigen-values is a quadratic-function that need to be solved, i.e., Eigen-Value-Decomposition (EVD) and is given by;

$$\lambda^2 - tr\{A\}\lambda + \det\{A\} = 0 \Rightarrow \lambda_{1,2} = \frac{tr\{A\} \pm \sqrt{tr\{A\}^2 - 4 \cdot \det\{A\}}}{2} \qquad \text{Eq. 14}$$

where $A \triangleq R_{in}^{-1}R_{zz}$, tr{A} is the trace of matrix A, and det{A} is the determinant of matrix A.

Finally, the optimal-weights that maximize the "ZINR-profit-function" for the interference-signal and the received-signal, obtained by the Principal-Component-Analysis (PCA)-method, will be used to reduce the interference-signal and preserve the desired-signal by the above described TDSIR-part of the TDSIR-procedure. Hence, the resulting interference-cancellation (IC) signal out of the TDSIR-part is then given by:

$$\hat{s}_{TDSIR}[n] = \underline{w}_{opt}^H \underline{z}[n] = \underline{w}_{opt}^H (\underline{s}[n] + \underline{i}[n] + \underline{n}[n]) \cong (\underline{w}_{opt}^H \underline{s}[n]) + v[n] \qquad \text{Eq. 15}$$

Note, that the optimal-weights are updated every N-samples and that v[n] is complex-Gaussian noise with zero-mean and variance $\sigma^2 = N_0$ (i.e., optimal-weights are normalized) and i[n] is assumed to be "nulled-out" by the optimal-weights $\{\underline{w}_{opt}\}$.

1.3 An Example Embodiment

Examples disclosed here in relate to a Time-division spatial Interference Rejection (TDSIR)-procedure, which consists of a TDSIR-part and a maximal-ratio-Combining (MRC)-weighing-part, for rejection of, especially, the extremely-diverse interference-signals generated by electrical-vehicles that degrade or even make the reception of Digital Audio Broadcasting (DAB) data and audio-streams completely impossible.

Such examples can reduce the effects of a wide-variety of interference-signals generated by electrical-vehicles that impair a DAB-transmission. The DAB-streams can be received with at least a two-path (antennae)-receiver. In some embodiments the receiver system can comprise: i) a Maximal-Ratio-Combining (MRC)-weighing-part and ii) a "Time-Division Spatial Interference Rejection (TDSIR)-part. The combination of the TDSIR-part, as an extra input to the MRC-weighing-part, and the MRC-weighing-part we call the TDSIR-procedure. The TDSIR-procedure can advantageously reject the co-channel interference-signal in a "weighed-fashion" where it is more-or-less agnostic to the spectral-content of the co-channel interference thanks to the spatial-domain approach by the principal Eigen-vector procedure, i.e, the Principal Component Analysis (PCA) explained in Section 1.2.1. In the next section, Section 1.3.1, we show the performance improvement in average Bit-Error-Rate (BER) versus the required bit-energy-to-noise ratio $$\left(\frac{E_b}{N_0}\right).$$

1.3.1 Time-Division Spatial Interference Rejection (TDSIR) Performance

Section 1.2.1 describes the procedure of a time-division spatial-based co-channel interference rejection, specific for DAB-reception. The TDSIR-part of the TDSIR-procedure exploits the availability of a NULL-symbol, i.e., a time-slot that no desired-signal (S) is available in the transmitted DAB-stream and the time-slots that the sum-signal (Z=S+I+N) of the desired-signal (S) and the undesired-signal (I+N) is available, i.e., the successive OFDM-symbol time-slots of the transmitted DAB-stream. With these different time-slots, NULL-symbol and the OFDM-symbols, a time-division cost-function, or even better a profit-function, is constructed that maximizes (indirectly) the SINR with the Principal Component Analysis (PCA) method.

The, for example, DAB-signals, are received by at least two paths (antennae) and are weighed such that the co-channel interference-signal is significantly reduced (ideally, removed completely), which is called; "Time-division spatial Interference Rejection (TDSIR)", i.e., the TDSIR-part in FIG. 3 and FIG. 5. The novel TDSIR-part performs rejection of co-channel interference-signal, e.g. generated by electrical-vehicles, of the received DAB-signals in an optimal Signal+Interference+Noise-to-Interference+Noise Ratio manner (i.e., maximizing the profit-function; ZINR) and it can comprise: i) a novel time-division training-signal generation, ii) specific spatial-covariance matrices (SCM)s computations, iii) specific Eigenvalue decompositions (EVD)s, and iv) a specific Principal Component Analysis (PCA) to obtain the principal Eigen-vector. The principal Eigenvector gives the necessary weights for the reduction of the interference-signals, see Section 1.2.1.

FIG. 13 shows plots of BER vs SNR for a DAB-transmission with DC-DC-converter interference-signal and AWGN.

The solid lines in FIG. 13 show the performance of a receiver system that is described herein whereby the undesired-signal-components and the combined-signal-components are separated from each other in the time domain (e.g. using a null-symbol in a DAB signal for providing the undesired-signal-components).

The dotted lines in FIG. 13 show the performance of a receiver system that is described herein whereby the undesired-signal-components and the combined-signal-components are separated from each other in the frequency domain (e.g. using null-carriers in an OFDM signal for providing the undesired-signal-components).

The dashed lines in FIG. 13 show the performance of a receiver system that does not include a spatial-information-processing-block as described herein.

Instead, only the signal-processing-path-output-signals/conventional MRC-signals are used to calculate the receiver-output-signal.

That is, the dashed lines in FIG. 13 show the conventional performance (i.e., no TDSIR-procedure), the solid- and dotted-curves show the performances of the novel proposed TDSIR-procedure where the TDSIR-part operating in the time-domain on time-samples and in the frequency-domain on frequency-samples, respectively.

It can be seen from FIG. 13 that embodiments of the low-complexity TDSIR-procedure that are described herein result in significant performance improvements, as represented by the BER vs SNR $$\left(\frac{E_b}{N_0}\right)$$

curve for a DAB-transmission with the DC-DC-converter co-channel interference-signal.

The performance of each of the three systems (the solid lines, the dotted lines, and the dashed lines), is shown for four different Signal-to-Interference-Ratios (SIR)s: very high SIR ($\infty$))—shown with square symbols; 20 dB—shown with circle symbols; 10 dB—shown with asterisk symbols; 0 dB—shown with cross symbols.

FIG. 13 shows that the performance of receiver systems disclosed herein is comparable irrespective of whether the undesired-signal-components are separated from the combined-signal-components in the time domain or the frequency domain. That is, the solid lines are similar to the dotted lines. Therefore, the performance of the TDSIR-procedures where the TDSIR-part operates in the time-domain on time-samples or in the frequency-domain on frequency-samples is very similar.

From FIG. 13, at a BER=$10^{-4}$, it can be noticed that for SIR of 10 dB (and less) already a floor occurs. Consequently, a BER=$10^{-4}$ is not achievable with a conventional (prior-art) DAB-receiver. If the TDSIR-part is applied, then SIR-values above 10 dB introduce a small loss. In addition, due to the maximization of the ZINR-profit-function, even sensitivity-gains up to a maximum $10 \log_{10} N_{RX}$ dB can be achieved. For a DAB-reception with the TDSIR-part and where $N_{RX}$=2-receiver-paths (antennae) gives a 3 dB gain. Note, this sensitivity improvement, by coherently combining, can be a trade-off against interference-rejection, i.e., the stronger the interference the more suppression and the less coherent-combining. This trade-off between rejection and combining can also be observed in FIG. 13 for an SIR=0 dB, i.e., the desired and undesired signal are of the same power-level. Here the interference is taking-out on the expense of roughly 3 dB compared to no or weak co-channel interference-signals. This "automatic-trade-off", between suppression of the co-channel interference-signal and the combining of the desired DAB-transmission on both paths, is due to the maximization of the ZINR profit-function of the novel proposed TDSIR-part.

Examples disclosed herein can differ from interference rejection combining (IRC) in one or more of the following ways:
1) TDSIR maximizes a profit function, namely the ZINR of the received signal. It is shown that this optimal combining weights can also maximize the SINR of the received signal. This optimization can use the spatial covariance matrix of the interference plus noise and the spatial covariance matrix of the Z signal (desired signal plus interference and noise). For the targeted DAB system, the covariance matrix of the interference plus noise can be calculated e.g. using the received null symbol, where only interference and noise is present. The covariance matrix of the Z signal can be calculated e.g. using the TFPR symbol where signal, interference and noise are all present. Advantageously TDSIR does not need dedicated pilots nor explicit channel information of the desired signal/interference.
2) TDSIR does not require explicit channel estimates of the desired signal in the presence of the interference and noise. Dedicated pilots are not required for channel estimates on the pilot carriers. Knowledge of interference pilots is also not needed to mitigate the effects of interference on this channel estimation. Interpolation techniques are not required to find the desired signal channel estimates and information of interference plus noise on the data carriers. A Minimum Mean Square Error (MMSE) detector, obtained from the interpolated information, does not need to be applied on the received data carrier.
3) Handling with MRC: In the TDSIR approach, the TDSIR output is optimally combined with the conventional MRC outputs, the so-called MRC+. A switching method is not required, such that the receiver does not need to switch between IRC and MRC based on an estimate of the signal to interference ratio.

Figure 14:
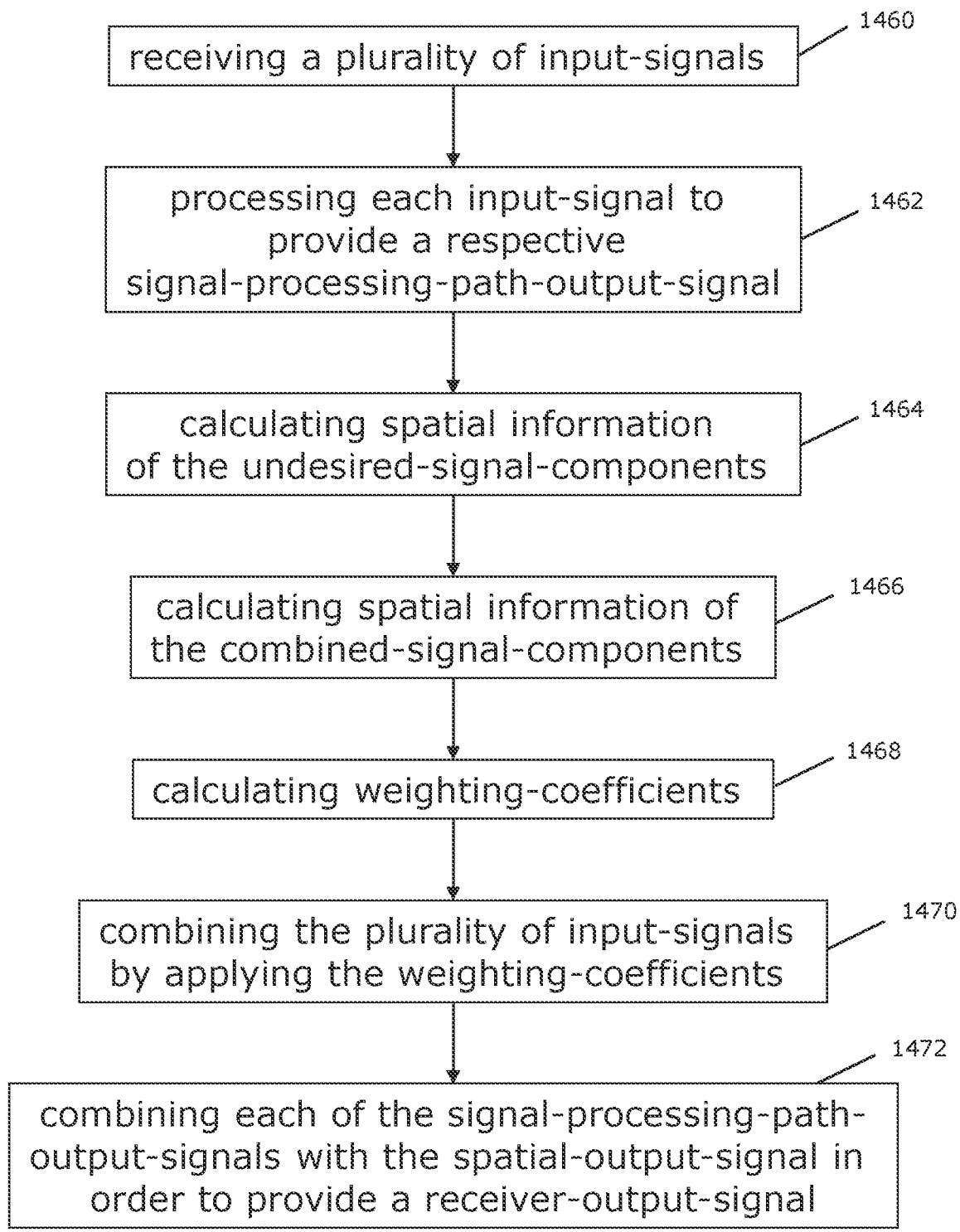
FIG. 14 shows an example embodiment of a method according to the present disclosure.

FIG. 14 shows an example embodiment of a method according to the present disclosure. The method can be performed by hardware or software, and in some examples can be implemented by any of the receiver systems disclosed herein.

At step 1460, the method receives a plurality of input-signals from respective antennae. The input-signals comprise: i. one or more undesired-signal-components that represent noise components and/or interference-components; and ii. one or more combined-signal-components that represent: a) transmitted-signal-components, and b) noise components and/or interference-components.

At step 1462, the method processes each input-signal to provide a respective signal-processing-path-output-signal.

At step 1464, the method calculates spatial information of the undesired-signal-components of the plurality of input-signals.

At step 1466, the method calculates spatial information of the combined-signal-components of the plurality of input-signals.

At step 1468, the method calculates weighting-coefficients for each of the input-signals based on the spatial information of the combined-signal-components and the spatial information of the undesired-signal-components.

At step 1470, the method combines the plurality of input-signals by applying the weighting-coefficients to each of the input-signals to provide a spatial-output-signal. As discussed in detail above, any interference and noise that is spatially separated from the desired transmitted data can be greatly reduced in the spatial-output-signal.

At step 1472, the method combines each of the signal-processing-path-output-signals with the spatial-output-signal in order to provide a receiver-output-signal.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A receiver system comprising:
a plurality of receiver-input-terminals, each of which is configured to receive an input-signal from a respective antenna, wherein the input-signals comprise:
  i. one or more undesired-signal-components that represent noise components and/or interference-components; and
  ii. one or more combined-signal-components that represent: a) transmitted-signal-components, and b) noise components and/or interference-components;
a plurality of signal-processing-paths, each configured to:
  process an input-signal from a respective one of the plurality of receiver-input-terminals; and
  provide a signal-processing-path-output-signal;
a spatial-information-processing-block configured to:
  calculate spatial information of the undesired-signal-components of the plurality of input-signals;
  calculate spatial information of the combined-signal-components of the plurality of input-signals;
  calculate weighting-coefficients for each of the input-signals based on the spatial information of the combined-signal-components and the spatial information of the undesired-signal-components; and
  combine the plurality of input-signals by applying the weighting-coefficients to each of the input-signals to provide a spatial-output-signal; and
a signal-combiner configured to combine each of the signal-processing-path-output-signals with the spatial-output-signal in order to provide a receiver-output-signal.

2. The receiver system of claim 1, wherein the one or more undesired-signal-components do not include transmitted-signal-components.

3. The receiver system of claim 1, wherein the spatial-information-processing-block is configured to:
calculate the spatial information of the undesired-signal-components of the plurality of input-signals by determining phase-rotations of the undesired-signal-components; and
calculate the spatial information of the combined-signal-components of the plurality of input-signals by determining phase-rotations of the combined-signal-components.

4. The receiver system of claim 1, wherein the spatial-information-processing-block is configured to:
- calculate the spatial information of the undesired-signal-components of the plurality of input-signals by determining a spatial covariance matrix for the undesired-signal-components; and
- calculate the spatial information of the combined-signal-components of the plurality of input-signals by determining a spatial covariance matrix for the combined-signal-components.

5. The receiver system of claim 1, wherein the spatial-information-processing-block is configured to:
- calculate the weighting-coefficients for each of the input-signals by applying a profit function to the spatial information of the combined-signal-components and the spatial information of the undesired-signal-components.

6. The receiver system of claim 1, wherein the spatial-information-processing-block is configured to:
- calculate the weighting-coefficients for each of the input-signals by maximising a SINR profit function, wherein: the spatial information of the combined-signal-components represents the S of the SINR profit function; and the spatial information of the undesired-signal-components represents the IN of the SINR profit function.

7. The receiver system of claim 1, wherein the signal-combiner is configured to apply a maximum-ratio combining algorithm in order to combine each of the signal-processing-path-output-signals with the spatial-output-signal and provide a receiver-output-signal.

8. The receiver system of claim 1, wherein:
 i. the one or more undesired-signal-components represent one or more null-periods of the input-signal, wherein the null-periods represent periods in time that the input-signal does not contain any transmitted data; and
 ii. the one or more combined-signal-components represent one or more transmission-periods of the input-signal, wherein the transmission-periods represent periods in time that the input-signal contains transmitted data.

9. The receiver system of claim 8, wherein the input-signals are DAB signals, and the null-periods are null-symbols in the DAB signals.

10. The receiver system of claim 1, wherein:
 i. the one or more undesired-signal-components represent one or more null-carriers of the input-signal, wherein the null-carriers represent frequencies at which the input-signal does not contain any transmitted data; and
 ii. the one or more combined-signal-components represent one or more transmission-carriers of the input-signal, wherein the transmission-carriers represent frequencies at which the input-signal contain transmitted data.

11. The receiver system of claim 10, wherein the input-signals are OFDM signals, and the null-carriers represent predetermined frequencies between adjacent channels.

12. The receiver system of claim 1, wherein the signal-combiner is configured to reduce first-adjacent co-channel interference signals and provide the receiver-output-signal by combining each of the signal-processing-path-output-signals with the spatial-output-signal by using a statistically-based analysis of the spatial-output-signal to compensate for the first-adjacent co-channel interference.

13. The receiver system of claim 1, wherein the signal-combiner is configured to perform maximum-ratio combining on the signal-processing-path-output-signals with the spatial-output-signal.

14. A method comprising:
- receiving a plurality of input-signals from respective antennae, wherein the input-signals comprise:
  i. one or more undesired-signal-components that represent noise components and/or interference-components; and
  ii. one or more combined-signal-components that represent: a) transmitted-signal-components, and b) noise components and/or interference-components;
- processing each input-signal to provide a respective signal-processing-path-output-signal;
- calculating spatial information of the undesired-signal-components of the plurality of input-signals;
- calculating spatial information of the combined-signal-components of the plurality of input-signals;
- calculating weighting-coefficients for each of the input-signals based on the spatial information of the combined-signal-components and the spatial information of the undesired-signal-components;
- combining the plurality of input-signals by applying the weighting-coefficients to each of the input-signals to provide a spatial-output-signal; and
- combining each of the signal-processing-path-output-signals with the spatial-output-signal in order to provide a receiver-output-signal.

15. An automobile comprising the receiver system of claim 1.

16. The method of claim 14, wherein the one or more undesired-signal-components do not include transmitted-signal-components.

17. The method of claim 14, wherein:
- calculating spatial information of the undesired-signal-components of the plurality of input-signals includes calculating spatial information of the undesired-signal-components of the plurality of input-signals by determining phase-rotations of the undesired-signal-components; and
- calculating spatial information of the combined-signal-components of the plurality of input-signals includes calculating spatial information of the combined-signal-components of the plurality of input-signals by determining phase-rotations of the combined-signal-components.

18. The method of claim 14, wherein:
- calculating spatial information of the undesired-signal-components of the plurality of input-signals includes calculating spatial information of the undesired-signal-components of the plurality of input-signals by determining a spatial covariance matrix for the undesired-signal-components; and
- calculating spatial information of the combined-signal-components of the plurality of input-signals includes calculating spatial information of the combined-signal-components of the plurality of input-signals by determining a spatial covariance matrix for the combined-signal-components.

19. The method of claim 14, wherein calculating weighting-coefficients for each of the input-signals includes calculating weighting-coefficients for each of the input-signals by applying a profit function to the spatial information of the combined-signal-components and the spatial information of the undesired-signal-components.

20. The method of claim 14, wherein calculating weighting-coefficients for each of the input-signals includes calculating weighting-coefficients for each of the input-signals by maximising a SINR profit function, wherein: the spatial information of the combined-signal-components represents the S of the SINR profit function; and the spatial information of the undesired-signal-components represents the IN of the SINR profit function.

\* \* \* \* \*